(12) United States Patent
Choi et al.

(10) Patent No.: US 10,452,230 B2
(45) Date of Patent: Oct. 22, 2019

(54) ELECTRONIC DEVICE AND METHOD FOR ADDING HOME SCREEN PAGE

(71) Applicant: Samsung Electronics Co., Ltd, Gyeonggi-do (KR)

(72) Inventors: Bo-Kun Choi, Seoul (KR); Doo-Suk Kang, Gyeonggi-do (KR); Geon-Soo Kim, Gyeonggi-do (KR); Dong-Hyun Yeom, Gyeonggi-do (KR); Pil-Joo Yoon, Gyeonggi-do (KR); Yong-Joon Jeon, Gyeonggi-do (KR); Min-Kyung Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 433 days.

(21) Appl. No.: 14/719,105

(22) Filed: May 21, 2015

(65) Prior Publication Data
US 2015/0339400 A1    Nov. 26, 2015

(30) Foreign Application Priority Data
May 21, 2014    (KR) .................. 10-2014-0060710

(51) Int. Cl.
| | | |
|---|---|---|
| G06F 3/0482 | (2013.01) | |
| G06F 3/0484 | (2013.01) | |
| G06F 16/955 | (2019.01) | |
| G06F 3/0488 | (2013.01) | |
| G06F 3/0485 | (2013.01) | |

(52) U.S. Cl.
CPC .......... *G06F 3/0482* (2013.01); *G06F 3/0484* (2013.01); *G06F 3/0485* (2013.01); *G06F 3/0488* (2013.01); *G06F 3/04842* (2013.01); *G06F 3/04883* (2013.01); *G06F 16/9562* (2019.01)

(58) Field of Classification Search
CPC .. G06F 3/0482; G06F 3/0481; G06F 3/04883; G06F 9/4443; G06F 3/04842; G06F 3/0488; G06F 3/04886; G06F 16/9562
See application file for complete search history.

(56) References Cited

U.S. PATENT DOCUMENTS

| | | | |
|---|---|---|---|
| 2010/0093396 A1* | 4/2010 | Roundtree | H04M 1/72522 455/558 |
| 2010/0122220 A1* | 5/2010 | Ainsworth | G06F 17/30899 715/866 |
| 2010/0262673 A1* | 10/2010 | Chang | G06F 3/1454 709/217 |
| 2011/0185283 A1* | 7/2011 | Jun | H04M 1/72572 715/745 |
| 2012/0025974 A1* | 2/2012 | Richey | H04W 4/023 340/539.13 |

(Continued)

FOREIGN PATENT DOCUMENTS

KR    20130024623 A    3/2013

*Primary Examiner* — Tuyetlien T Tran

(57) ABSTRACT

A method for operating an electronic device includes determining whether a preset triggering condition is satisfied; when satisfying the preset triggering condition, requesting extended page data corresponding to the triggering condition, from either a server or a connectable device; and receiving the requested data from either the server or the connectable device, and adding and displaying at least one page in a home screen.

10 Claims, 18 Drawing Sheets

(56) References Cited

U.S. PATENT DOCUMENTS

| | | | | |
|---|---|---|---|---|
| 2012/0056807 A1* | 3/2012 | Chapman | ............... | G06F 3/0428 345/158 |
| 2012/0071208 A1* | 3/2012 | Lee | ................... | H04M 1/72544 455/566 |
| 2012/0079432 A1* | 3/2012 | Lee | ....................... | G06F 3/0483 715/838 |
| 2012/0149435 A1* | 6/2012 | Jang | .................. | H04M 1/72563 455/558 |
| 2012/0297304 A1* | 11/2012 | Maxwell | ........... | H04M 1/72569 715/728 |
| 2012/0309377 A1* | 12/2012 | De Atley | .............. | H04W 8/245 455/418 |
| 2012/0309463 A1* | 12/2012 | Lee | ....................... | G06F 3/0482 455/566 |
| 2013/0125043 A1* | 5/2013 | Jeon | .................... | G06F 3/04815 715/782 |
| 2013/0260832 A1* | 10/2013 | Park | ..................... | H04B 1/3816 455/558 |
| 2014/0055251 A1* | 2/2014 | Son | ....................... | G08C 17/02 340/12.54 |
| 2014/0123013 A1* | 5/2014 | Lee | ....................... | G06F 3/0481 715/719 |
| 2014/0123022 A1* | 5/2014 | Lee | ....................... | G06F 9/4443 715/747 |
| 2014/0207617 A1* | 7/2014 | An | ..................... | G06Q 30/0641 705/26.61 |
| 2014/0298249 A1* | 10/2014 | Lee | ....................... | G06F 3/0481 715/781 |
| 2015/0149802 A1* | 5/2015 | Vayrynen | .............. | G06F 1/3265 713/323 |

* cited by examiner

ELECTRONIC DEVICE AND METHOD FOR ADDING HOME SCREEN PAGE

CROSS-REFERENCE TO RELATED APPLICATION AND CLAIM OF PRIORITY

The present application claims the benefit under 35 U.S.C. § 119(a) to a Korean patent application filed in the Korean Intellectual Property Office on May 21, 2014 and assigned Serial No. 10-2014-0060710, the entire disclosure of which is hereby incorporated by reference.

TECHNICAL FIELD

The present disclosure relates to an electronic device and a method for adding a home screen page.

BACKGROUND

With advances in information communication technologies and semiconductor technologies, various electronic devices are evolving into multimedia devices for providing various multimedia services. For example, the electronic device provides various multimedia services such as voice telephony service, video telephony service, messenger server, broadcasting service, wireless Internet service, camera service, and music play service.

Such an electronic device provides a default home screen page for executing various applications. To execute an application installed in the electronic device, a user first enters the home screen page.

Current electronic device manufacturers provide the same screen in the electronic device. Since the manufacturer initially configures settings and does not allow setting modification in released electronic devices, scenarios in various settings and configurations are not supported.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, it is a primary aspect of the present disclosure to provide an apparatus and a method for enhancing user convenience by additionally providing a home screen page in various situations.

Various embodiments of the present disclosure provide an apparatus and a method for satisfying both of a user and a service provider by displaying information about a new device in an added home screen page or immediately reflecting a requirement of the provider.

According to various embodiments of the present disclosure, a method for operating an electronic device includes determining whether a preset triggering condition is satisfied; when satisfying the preset triggering condition, requesting extended page data corresponding to the triggering condition, from either a server or a connectable device; and receiving the requested data from either the server or the connectable device, and adding and displaying at least one page in a home screen.

According to various embodiments of the present disclosure, an electronic device includes a processor for determining whether a preset triggering condition is satisfied; a communication module for, when the preset triggering condition is satisfied, requesting extended page data corresponding to the triggering condition, from either a server or a connectable device; and a display module for receiving the requested data from either the server or the connectable device, and adding and displaying at least one page in a home screen.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith." as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
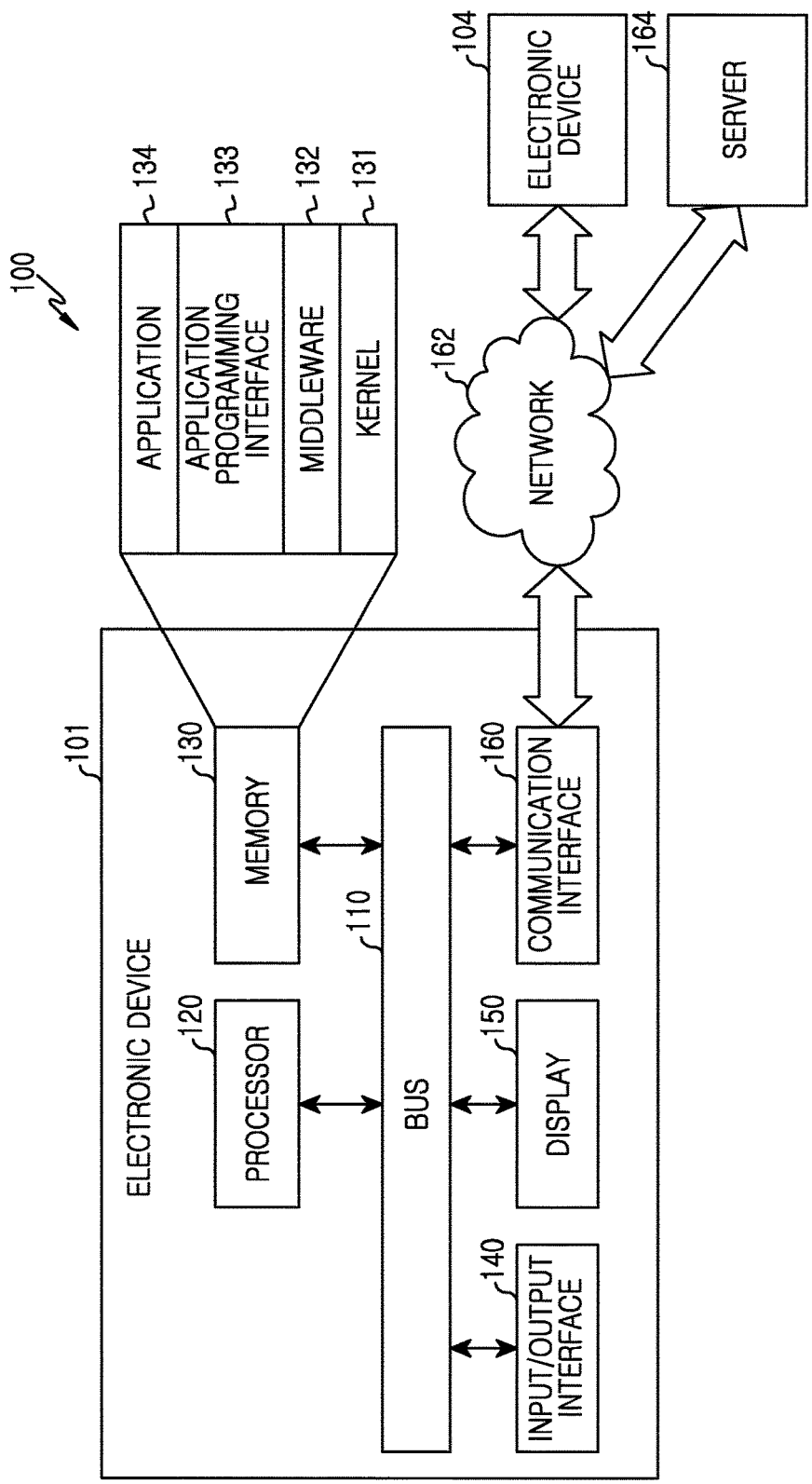
FIG. 1 illustrates a network environment including an electronic device according to various embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

As used in the present disclosure, terms such as "includes" or "may include" refer to the presence of the corresponding function, operation or feature, and do not limit the presence of additional functions, operations or features. Also, terms such as "includes" or "has" refers to the presence of characteristics, numbers, steps, operations, components or combinations thereof, and is not intended to exclude one or more additional characteristics, numbers, steps, operations, components or combinations thereof.

As used in the present disclosure, the term "or" is used to include any and all combination of terms listed. For examples, "A or B" includes only A, only B, or both A and B.

As used in the present disclosure, terms such as "first" or "second" are used to describe various features, but do not limit such features. For example, the terms do not limit the order or the importance of their associated features. Such terms are used to differentiate one feature from another. For example, a first user equipment (alternatively, "UE") and a second user equipment are both user equipment, but are different user equipment. For example, without departing from the scope of the present disclosure, a first component can be called a second component, and likewise, a second component can be called a first component.

When a component is said to be "connected with" or "connected to" another component, the component is directly connected with, or connected to, the other component, or another component exists in between. On the other hand, when a component is said to be "directly connected with" or "directly connected to" another component, it should be understood that no components exist in between.

By the term "substantially" it is meant that the recited characteristic, parameter, or value need not be achieved exactly, but that deviations or variations, including for example, tolerances, measurement error, measurement accuracy limitations and other factors known to those of skill in the art, occurs in amounts that do not preclude the effect the characteristic was intended to provide. Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to various embodiments of the present disclosure is a device including communication functionality. For example, the electronic device includes at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical appliance, a camera, and a wearable device (such as a head-mounted-device (HMD) such as electronic glasses, an electronic textiles, an electronic bracelet, an electronic necklace, an electronic appcessory, an electronic tattoo, and a smart watch).

According to various embodiments, the electronic device is a smart home appliance having the communication functionality. The smart home appliance include, for example, at least one of a television, a digital video disk (DVD) player, an audio, a refrigerator, an air conditioner, a vacuum cleaner, an oven, a microwave oven, a washing machine, an air purifier, a set-top box, a TV box (such as SAMSUNG HOMESYNC, APPLE TV®, or GOOGLE TV®), game consoles, an electronic dictionary, a digital key, a camcorder, and a digital frame.

According to various embodiments, the electronic device includes at least one of various medical appliances (such as magnetic resonance angiography (MRA), magnetic resonance imaging (MRI), computed tomography (CT), X-ray, ultrasonicator)), a navigation device, a global positioning system (GPS) receiver, an event data recorder (EDR), a flight data recorder (FDR), an in-vehicle infotainment device, marine electronic equipment (such as marine navigation device and gyro compass), avionics, a security device, an automotive head unit, an industrial or home robot, an automatic teller's machine (ATM) of a financial company, and a point of sale (POS) of a store.

According to various embodiments, the electronic device includes at least one of part of furniture or building or structure having the communication functionality, an electronic board, an electronic signature receiving device, a projector, and various gauges (such as gauges for water, electricity, gas, and radio wave). The electronic device according to embodiments of the present disclosure is one or a combination of those various devices. The electronic device is a flexible device. Those skilled in the art shall understand that the electronic device according to embodiments of the present disclosure is not limited those devices.

Various embodiments of the present disclosure provide an electronic device by referring to the attached drawings. The term 'user' used in embodiments of the present disclosure represents a person or a device (such as artificial intelligent electronic device) who or which uses the electronic device.

FIG. 1 depicts a network environment 100 including an electronic device 101 according to various embodiments of the present disclosure. Referring to FIG. 1, the electronic device 101 includes a bus 110, a processor 120, a memory 130, an input/output interface 140, a display 150, and a communication interface 160.

The bus 110 is a circuit for interlinking the above-stated components and transferring communication signals (such as control messages) between the above-stated components.

The processor 120, for example, receives an instruction from the other components (such as the memory 130, the input/output interface 140, the display 150, or the communication interface 160) via the bus 110, interprets the received instruction, and performs an operation or a data processing according to the interpreted instruction.

The memory 130 stores the instruction or the data received from or generated by the processor 120 or the other components (such as the input/output interface 140, the display 150, or the communication interface 160). For example, the memory 130 includes programming modules of a kernel 131, a middleware 132, an Application Programming Interface (API) 133, and an application 134. The programming modules are implemented using software, firmware, or hardware, alone or in combination.

The kernel 131 controls or manages system resources (such as the bus 110, the processor 120, or the memory 130) used to execute the operation or the function of the other programming modules, for example, the middleware 132, the API 133, or the application 134. The kernel 131 provides an interface allowing the middleware 132, the API 133, or the application 134 to access and to control or manage the individual component of the electronic device 101.

The middleware 132 relays data between the API 133 or the application 134 and the kernel 131. For work requests received from the application 134, the middleware 132, for example, controls (such as schedule or load balance) the work requests by giving priority of the system resource (such as the bus 110, the processor 120, or the memory 130) of the electronic device 101 to at least one application of the application 134.

The API 133, which is an interface for the application 134 to control the function provided from the kernel 131 or the middleware 132, includes at least one interface or function (such as instruction) for, for example, file control, window control, image processing, or text control.

The application 134 includes a short message service (SMS) or multimedia messaging service (MMS) application, an e-mail application, a calendar application, an alarm application, a health care application (such as an application for measuring an exercise or a blood sugar level), or an environment information application (such as an application for providing air pressure, humidity, or temperature information). The application 134 is an application relating to information exchange between the electronic device 101 and an external electronic device (such as an electronic device 104). The information exchange application includes, for example, a notification relay application for relaying particular information to the external electronic device or a device management application for managing the external electronic device.

For example, the notification relay application relays notification information of the other application (such as the SMS/MMS application, the e-mail application, the health care application, or the environment information application) of the electronic device 101 to the external electronic device (such as the electronic device 104). The notification relay application receives and forwards the notification information from the external electronic device (such as the electronic device 104) to the user. The device management application manages (such as install, delete, or update) at least part of the function (such as turn-on or turn-off of the external electronic device (or some components) or display brightness (or resolution) control) of the external electronic device (such as the electronic device 104) communicating with the electronic device 101, the application running on the external electronic device, or a service (such as a call service or a message service) provided by the external electronic device.

The application 134 includes an application designated based on an attribute (such as a type of the electronic device) of the external electronic device (such as the electronic device 104). For example, when the external electronic device is an MP3 player, the application 134 includes an application relating to music play. When the external electronic device is a mobile medical device, the application 134 includes an application relating to the health care. The application 134 includes at least one of the applications designated in the electronic device 101 or the application received from the external electronic device (such as a server 106 or the electronic device 104).

The input/output interface 140 forwards the instruction or the data input from the user through an input/output device (such as a sensor, a keyboard, or a touch screen) to, for example, the processor 120, the memory 130, or the communication interface 160 via the bus 110. For example, the input/output interface 140 forwards user's touch data input through the touch screen, to the processor 120. Also, the input/output interface 140 outputs the instruction or the data received from the processor 120, the memory 130, or the communication interface 160 via the bus 10, through the input/output device (such as a speaker or a display). For example, the input/output interface 140 outputs voice data processed by the processor 120 to the user through the speaker.

The display 150 displays various information (such as multimedia data or text data) to the user.

The communication interface 160 connects the communication between the electronic device 101 and the external device (such as the electronic device 104 or the server 106). For example, the communication interface 160 communicates with the external device over a network 162 using wireless communication or wired communication. For example, the wireless communication includes at least one of wireless fidelity (Wi-fi), BLUETOOTH® (BT), near field communication (NFC), GPS, and cellular communication (such as long term evolution (LTE). LTE-Advanced (LTE-A), wideband code division multiple access (WCDMA), universal mobile telecommunications system (UMTS), wireless broadband (WiBro), or global system for mobile communications (GSM)). The wired communication includes at least one of, for example, universal serial bus (USB), high definition multimedia interface (HDMI), recommended standard (RS) 232, and plain old telephone service (POTS).

The network 162 is a telecommunications network. The telecommunications network includes at least one of a computer network, internet, internet of things, and a telephone network. A protocol (such as transport layer protocol, data link layer protocol, or physical layer protocol) for the communication between the electronic device 101 and the external device are supported by at least one of the application 134, the API 133, the middleware 132, the kernel 131, and the communication interface 160.

Figure 2:
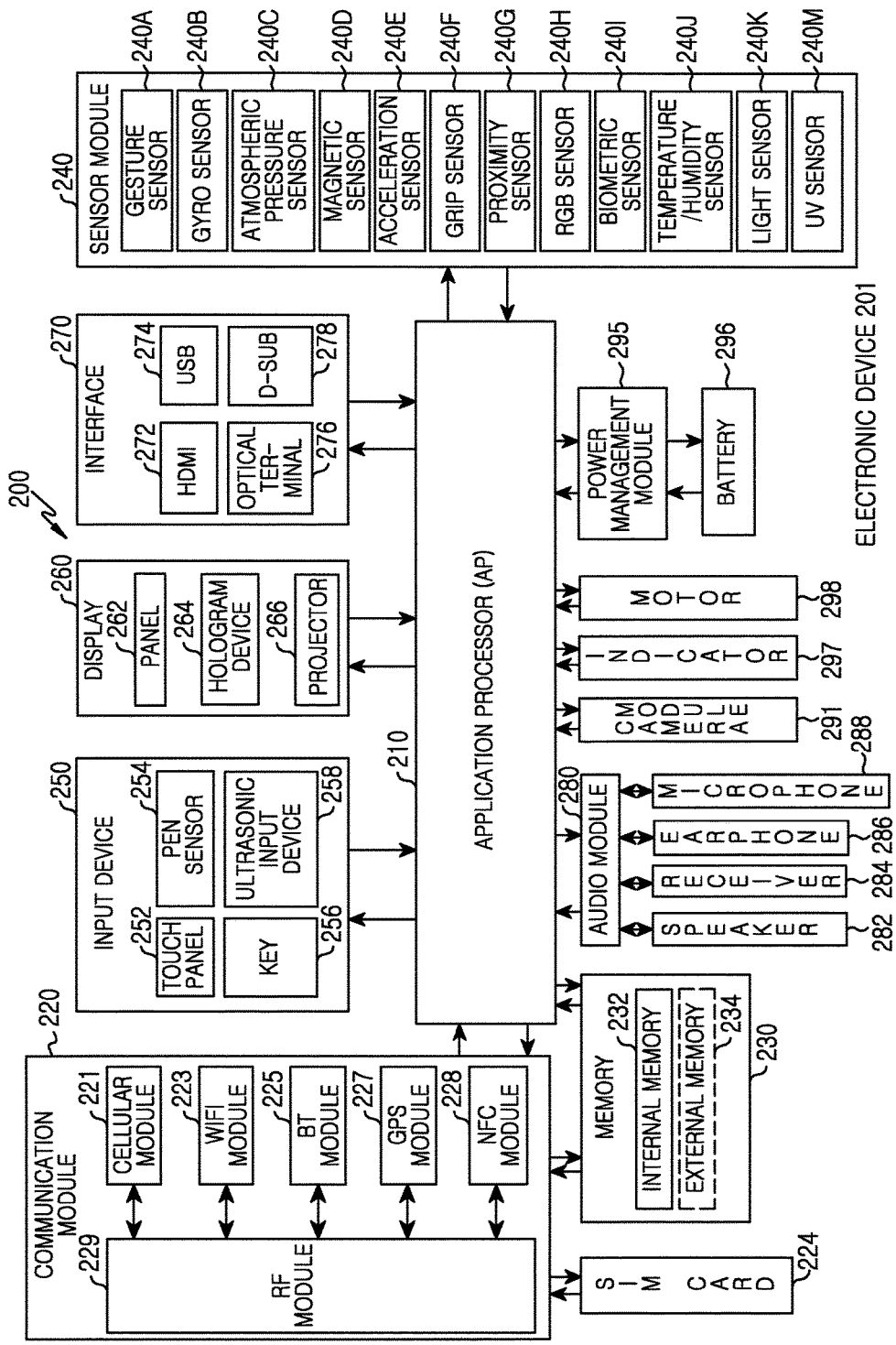
FIG. 2 illustrates hardware according to various embodiments of the present disclosure.

FIG. 2 is a block diagram 200 of an electronic device 201 according to various embodiments of the present disclosure. The electronic device 201 configures whole or part of the electronic device 101 of FIG. 1. Referring to FIG. 2, the electronic device 201 includes one or more application processors (APs) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls hardware or software components connected to the AP 210 by driving an operating system or an application program, and carry out various data processing and operations including multimedia data. The AP 210 is implemented using, for example, a system on chip (SoC). The AP 210 further includes a graphic processing unit (GPU) (not shown).

The communication module 220 (such as the communication interface 160) transmits and receives data in the communication between the electronic device 201 (such as the electronic device 101) and the other electronic devices (such as the electronic device 104 or the server 106) connected over the network. The communication module 220 includes a cellular module 221, a Wi-fi module 223, a BT module 225, a GPS module 227, an NFC module 228, and a Radio Frequency (RF) module 229.

The cellular module 221 provides a voice call, a video call, a text message service, or an Internet service over the communication network (such as LTE, LTE-A. CDMA, WCDMA, UMTS, WiBro, or GSM). Also, the cellular module 221 identifies and authenticates the electronic device in the communication network using the SIM (such as the SIM card 224). The cellular module 221 performs at least part of functions provided by the AP 210. For example, the cellular module 221 performs at least part of a multimedia control function.

The cellular module 221 includes a Communication Processor (CP). The cellular module 221 is implemented using, for example, the SoC. While the components of the cellular module 221 (such as the CP), the memory 230, and the power management module 295 are separated from the AP 210 in FIG. 2, the AP 210 includes at least part (such as the cellular module 221) of the above-stated components.

The AP 210 or the cellular module 221 (such as the CP) loads and processes the instruction or the data received from its connected non-volatile memory or at least one of the other components, in a volatile memory. Also, the AP 210 or the cellular module 221 stores data received from or generated by at least one of the other components, in the non-volatile memory.

The Wi-fi module 223, the BT module 225, the GPS module 227, or the NFC module 228 each includes, for example, a processor for processing the data transmitted and received via the corresponding module. While the cellular module 221, the Wi-fi module 223, the BT module 225, the GPS module 227, and the NFC module 228 are separated from each other in FIG. 2, at least part (such as at least two) of the cellular module 221, the Wi-fi module 223, the BT module 225, the GPS module 227, and the NFC module 228 are included in a single Integrated Chip (IC) or an IC package. For example, at least part (such as the CP corresponding to the cellular module 221 and the Wi-fi processor corresponding to the Wifi module 223) of the processors corresponding to the cellular module 221, the Wi-fi module 223, the BT module 225, the GPS module 227, and the NFC module 228 are implemented using a single SoC.

The RF module 229 transmits and receives the data, for example, RF signals. The RF module 229 includes, for example, a transceiver, a Power Amp Module (PAM), a frequency filter, and a low noise amplifier (LNA), which are not shown. The RF module 229 further includes a component, for example, a conductor or a conducting wire, for sending and receiving electromagnetic waves in free space during the wireless communication. While the cellular module 221, the Wi-fi module 223, the BT module 225, the GPS module 227, and the NFC module 228 share the single RF module 229 in FIG. 2, at least one of the cellular module 221, the Wi-fi module 223, the BT module 225, the GPS module 227, and the NFC module 228 transmits and receives the RF signals via a separate RF module.

The SIM card 224 is a card including the SIM and inserted to a slot formed at a specific location of the electronic device. The SIM card 224 includes unique identification information (such as integrated circuit card identifier (IC-CID)) or subscriber information (such as international mobile subscriber identity (IMSI)).

The memory 230 (such as the memory 130) includes an internal memory 232 or an external memory 234. For example, the internal memory 232 includes at least one of the volatile memory (such as dynamic RAM (DRAM), static RAM (SRAM), synchronous dynamic RAM (SDRAM)) and the non-volatile memory (such as one-time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

The internal memory 232 is a Solid State Drive (SSD). The external memory 234 includes a flash drive, for example, a Compact Flash (CF), a Secure Digital (SD), a Micro-Secure Digital (SD), a Mini-SD, an extreme digital (xD), or a memory stick. The external memory 234 is functionally connected to the electronic device 201 via various interfaces. The electronic device 201 further includes a storage device (or a storage medium) such as hard drive.

The sensor module 240 measures a physical quantity or detects an operation status of the electronic device 201, and converts the measured or detected information to an electric signal. The sensor module 240 includes at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (such as red green blue (RGB) sensor), a biometric sensor 240I, a temperature/humidity sensor 240J, a light sensor 240K, or an ultraviolet (UV) sensor 240M. The sensor module 240 includes, for example, an E-noise sensor (not shown), an electromyography (EMG) sensor (not shown), an electroencephalogram (EEG) sensor (not shown), an electrocardiogram (ECG) sensor (not shown), an infra-red (IR) sensor (not shown), an iris sensor (not shown), or a finger print sensor (not shown). The sensor module 240 further includes a control circuit for controlling its one or more sensors.

The input device 250 includes a touch panel 252, a (digital) pen sensor 254, a key 256, and an ultrasonic input device 258. For example, the touch panel 252 recognizes touch input using at least one of capacitive, resistive, infrared, and ultrasonic wave techniques. Also, the touch panel 252 further includes a control circuit. The capacitive type recognizes physical contact or proximity. The touch panel 252 further includes a tactile layer. In certain embodiments, the touch panel 252 provides a tactile response to the user.

The (digital) pen sensor 254 is implemented using, for example, the same or similar method as or to the user's touch input, or using a separate recognition sheet. For example, the key 256 includes, for example, a physical button, an optical key, or a keypad. The ultrasonic input device 258 is a device capable of obtaining data by detecting microwaves through a microphone (such as a microphone 288) in the electronic device 201 through an input tool that generates an ultrasonic signal, allows radio frequency identification. The electronic device 201 receive user input from an external device (such as a computer or a server) connected using the communication module 220.

The display 260 (such as the display 150) includes a panel 262, a hologram device 264, or a projector 266. The panel 262 employs, for example, a liquid-crystal display (LCD) or an active-matrix organic light-emitting diode (AMOLED). The panel 262 is implemented, for example, flexibly, transparently, or wearably. The panel 262 is constructed as the single module with the touch panel 252. The hologram device 264 presents a three-dimensional image in the air using interference of light. The projector 266 displays the image by projecting the light onto a screen. The screen is placed, for example, inside or outside the electronic device 201. The display 260 further includes a control circuit for controlling the panel 262, the hologram device 264, or the projector 266.

The interface 270 includes, for example, an HDMI 272, a USB 274, an optical interface 276, or a D-subminiature (D-sub) 278. The interface 270 is included in, for example, the communication interface 160 of FIG. 1. The interface 270 includes, for example, mobile high-definition link (MHL) interface, secure digital (SD) card/multi-media card (MMC) interface, or infrared data association (IrDA) standard interface.

The audio module 280 converts sound to an electric signal and vice versa. At least part of the audio module 280 is included in, for example, the input/output interface 140 of FIG. 1. The audio module 280 processes sound information that is input or output through, for example, a speaker 282, a receiver 284, an earphone 286, or the microphone 288.

The camera module 291 is a device for capturing a still picture and a moving picture, and includes one or more image sensors (such as a front sensor or a rear sensor), a lens (not shown), an image signal processor (ISP) (not shown), or a flash (such as LED or xenon lamp) (not shown).

The power management module 295 manages power of the electronic device 201. The power management module 295 includes, although not depicted, for example, a power management integrated circuit (PMIC), a charger integrated circuit (IC), or a battery fuel gauge.

The PMIC is mounted in, for example, an IC or a SoC conductor. The charging type is divided to a wired type and a wireless type. The charger IC charges the battery and prevents overvoltage or overcurrent flow from the charger. The charger IC includes a charger IC for at least one of the wired charging type or the wireless charging type. The wireless charging type includes, for example, a magnetic resonance type, a magnetic induction type, and a microwave type and adds an additional circuit for the wireless charging, for example, a circuit such as coil loop, resonance circuit, or rectifier.

The battery gauge, for example, measures the remaining capacity of the battery 296 and the voltage, the current, or the temperature of the charging. The battery 296 stores or generates electricity, and supplies the power to the electronic device 201 using the stored or generated electricity. The battery 296 includes, for example, a rechargeable battery or a solar battery.

The indicator 297 displays a specific status of the electronic device 201 or its part (such as the AP 210), for example, booting state, message state, or charging state. The motor 298 converts the electric signal to a mechanic vibration. Although it is not depicted, the electronic device 201 includes a processing device (such as a GPU) for supporting mobile TV. The processing device for supporting the mobile TV processes media data in conformity to a standard, for example, digital multimedia broadcasting (DMB), digital video broadcasting (DVB), or media flow.

The aforementioned components of the electronic device according to various exemplary embodiments of the present disclosure each includes one or more components, and the name of the corresponding component can differ according to the type of the electronic device. The present electronic device includes at least one of the aforementioned components, omit some components, or further include other components. Some of the components of the present electronic device can be united into a single entity to thus carry out the same functions of the corresponding components.

According to various embodiments of the present disclosure, an electronic device includes a processor for determining whether a preset triggering condition is satisfied; a communication module for, when the preset triggering condition is satisfied, requesting extended page data corresponding to the triggering condition, from either a server or a connectable device; and a display module for receiving the requested data from either the server or the connectable device, and adding and displaying at least one page in a home screen.

The processor determines whether one or more SIMs are inserted.

The processor determines whether one or more preset devices are connectable.

The processor determines whether information is associated with at least one of a preset location, a preset time, and preset network information.

The communication module requests at least one service data associated with the inserted SIM from the server.

The communication module requests data associated with at least one service for controlling at least one device in a preset network, from the device.

The communication module requests data associated with at least one service for controlling a system in a preset space, from the server.

The communication module requests data associated with at least one service for obtaining relevant information in a preset space, from the server.

The display module displays at least one application associated with the inserted SIM in the added home screen page.

The display module displays at least one service for controlling at least one device placed in a preset network, in the added home screen page.

The display module displays at least one service for controlling at least one service for controlling a system in a preset space, in the added home screen page.

The display module displays at least one service for obtaining relevant information in a preset space, in the added home screen page.

The processor determines a preset language and a language provided by one of the server and the device, and the display module requests and receives home screen data of the determined language from the server.

The processor, when the preset triggering condition is satisfied, determines whether information is updated. When no information is updated, the display module displays the added home screen page.

The processor determines whether a particular region is entered using at least one of sound waves and ultrasonic waves collected.

The processor determines whether a particular region is entered using image information collected and visible light communications light fidelity (LiFi).

FIG. 3 depicts a home screen page added according to one exemplary embodiment of the present disclosure. The electronic device includes one or more home screen pages. The electronic device including the one or more home screen pages displays application multiple application information such as icons, widgets, and folders in the home screens. The home screen page addition in the electronic device is elucidated. Although not illustrated here, the application information includes the information such as icons, widgets, and folders displayed in the home screen of the electronic device.

When receiving from the user a command for executing the electronic device, the electronic device displays a main home screen page of the preset home screen pages. When a lock screen is set and released, the electronic device displays the main home screen page in its display.

The main home screen page of the electronic device is displayed first when the electronic device is executed in the home screens.

Figure 3A:
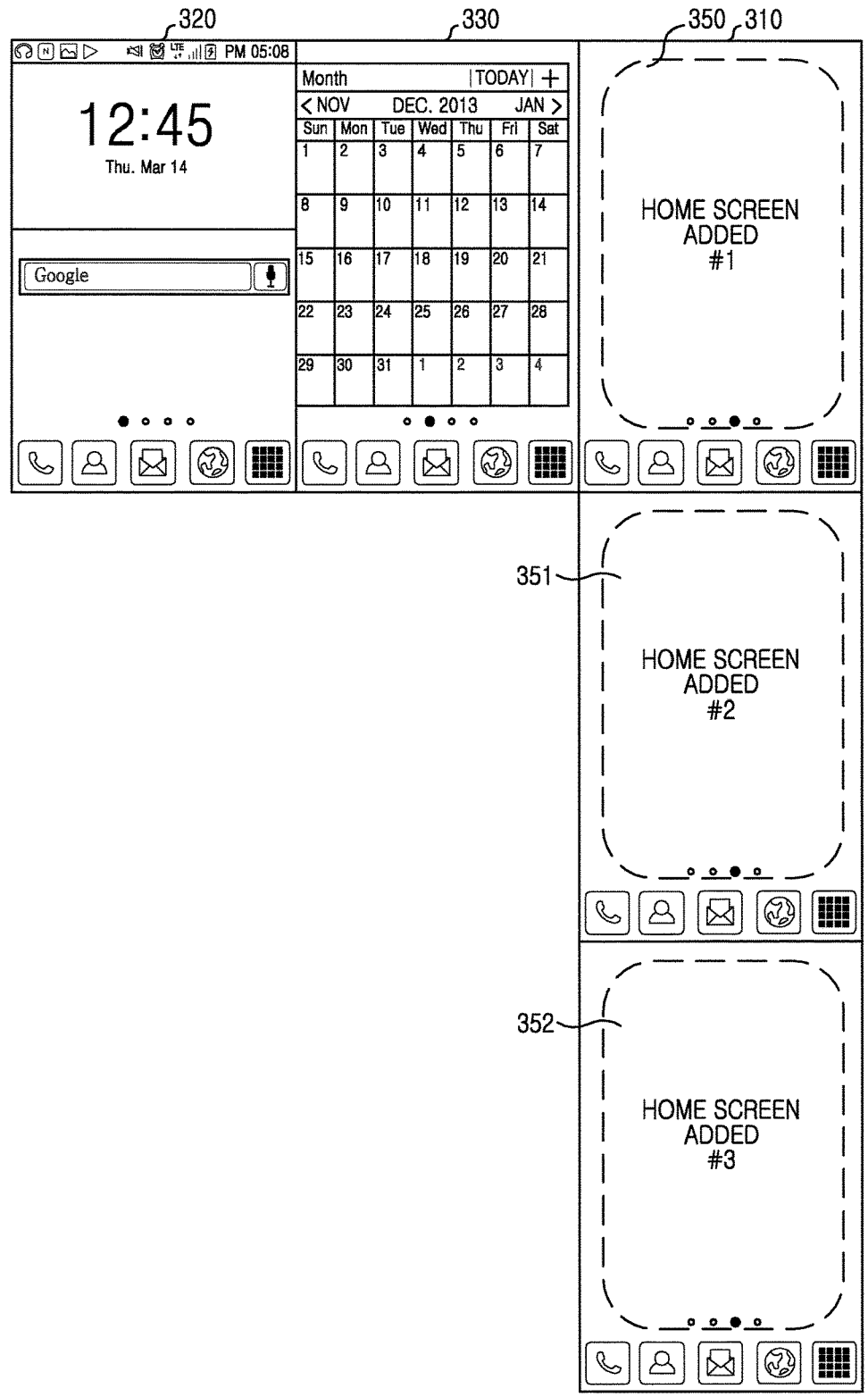
FIGS. 3A, 3B, and 3C illustrates a home screen page added according to various embodiments of the present disclosure.

As shown in FIG. 3A, when receiving the command for executing the electronic device from the user, the electronic device displays a main home screen page 320 of multiple home screen pages 320, 330, and 310. For example, the electronic device displays a screen showing weather of a region where the electronic device is currently located, a screen showing the current time, and icons of basic applications (a call application, a camera application, a text message application, and an Internet application) in the main home screen page 320 of the display. The home screen page of the electronic device also displays an application icon frequently executed, thus reducing user's interactions.

The electronic device displays a preset number of application icons installed in the other home screens than the main home screen page 320. For example, another home screen page 330 of the electronic device includes an icon of a schedule application according to a user's preference as shown in FIG. 3A.

When a preset triggering condition is satisfied, the electronic device adds one or more home screen pages to the home screen. For example, when the preset triggering condition is satisfied, the electronic device requests extended page data corresponding to the triggering condition from one of the server and a connectable device. The electronic device receives the requested data from either the server or the connectable device, and adds and displays at least one page in the home screen.

For example, as shown in FIG. 3A, the electronic device adds one home screen page 350 to the three existing home screen pages 320 and 330 widthwise. Contents or screen configuration of the added home screen page 350 is dynamically changed in the electronic device, and displayed variously according to the preset triggering condition.

After adding one home screen page 350 to the three existing home screen pages 320 and 330 lengthwise, the electronic device adds one or more new additional home pages 351 and 352 to the added home screen page 350 widthwise or lengthwise.

After adding the home screen page 350 to the existing home screen pages 320 and 330 widthwise, when detecting upward or downward scrolling through the added home page screen 350, the electronic device displays the one or more added home screen pages 351 and 352 lengthwise.

Figure 3B:
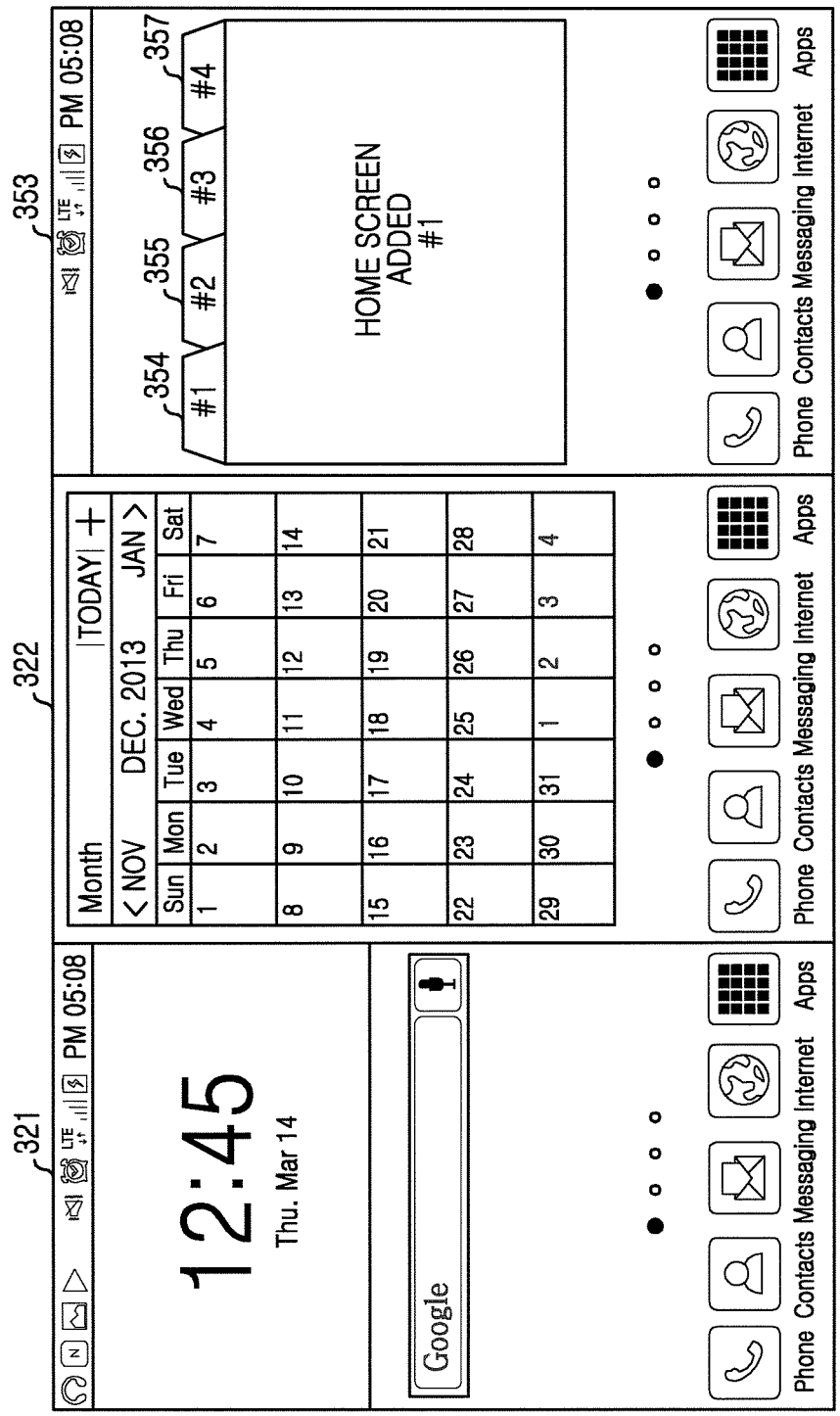

After adding one or more home screen pages to the existing home screen page, the electronic device displays tabs for selecting any one of the one or more added home screen pages. As shown in FIG. 3B, the electronic device displays 353 tabs 354 through 357 for selecting one of the home screen pages added to the existing home screen pages 321 and 322. After displaying the home screen page corresponding to the first tab 354 and selecting one of the second, third, and fourth tabs 355, 356, and 357, the electronic device displays the home screen page corresponding to the selected tab.

After adding one or more home screen pages to the existing home screen page, the electronic device displays widgets for selecting one of the one or more added home screen pages.

Figure 3C:
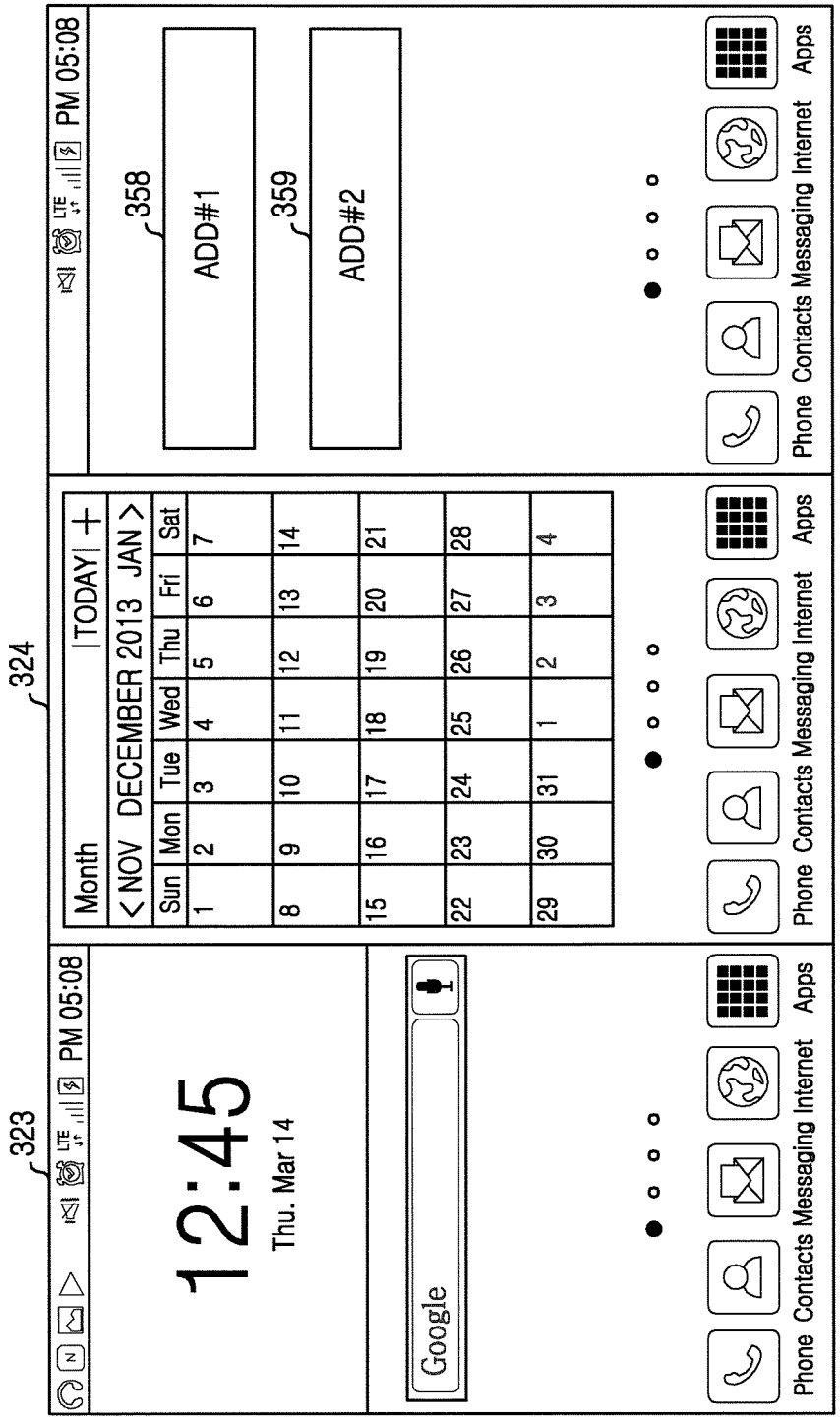

As shown in FIG. 3C, the electronic device displays one or more widgets 358 and 359 for selecting one of the home screen pages added to the existing home screen pages 323 and 324. After displaying the home screen page including the one or more widgets 358 and 359 and selecting one of the displayed widgets 358 and 359, the electronic device displays the home screen page corresponding to the selected widget.

When two widgets are added to the new home screen page, the electronic device displays the two widgets at 5:5 in the new home screen page. When three widgets are added to the new home screen page, the electronic device displays the three widgets at 3:3:3 in the new home screen page.

When displaying a plurality of widgets in the new home screen page, the electronic device displays a name and a representative image of the new home screen page, in each widget.

The electronic device receives contents (a page for displaying a banner) to be displayed in the widgets, from the server. For example, the contents to be displayed in the widgets of the electronic device are displayed using whole or part of page information received from the server.

The electronic device generates the page for displaying the banner using page configuration information received from the server. For example, the electronic device generates the page for displaying the banner using dynamic construction such as web application or hypertext markup language (HTML)5.

When one of the one or more widgets in the new home screen page is selected, the electronic device displays the home screen page corresponding to the selected widgets. For example, the electronic device displays the new widget in the wallpaper or moves the new widget to one of the existing home screen pages according to a user's selection. For example, the electronic device detects touching, dragging, or releasing the new widget according to the user's selection and detects the movement to one of the existing home screen pages.

Figure 4:
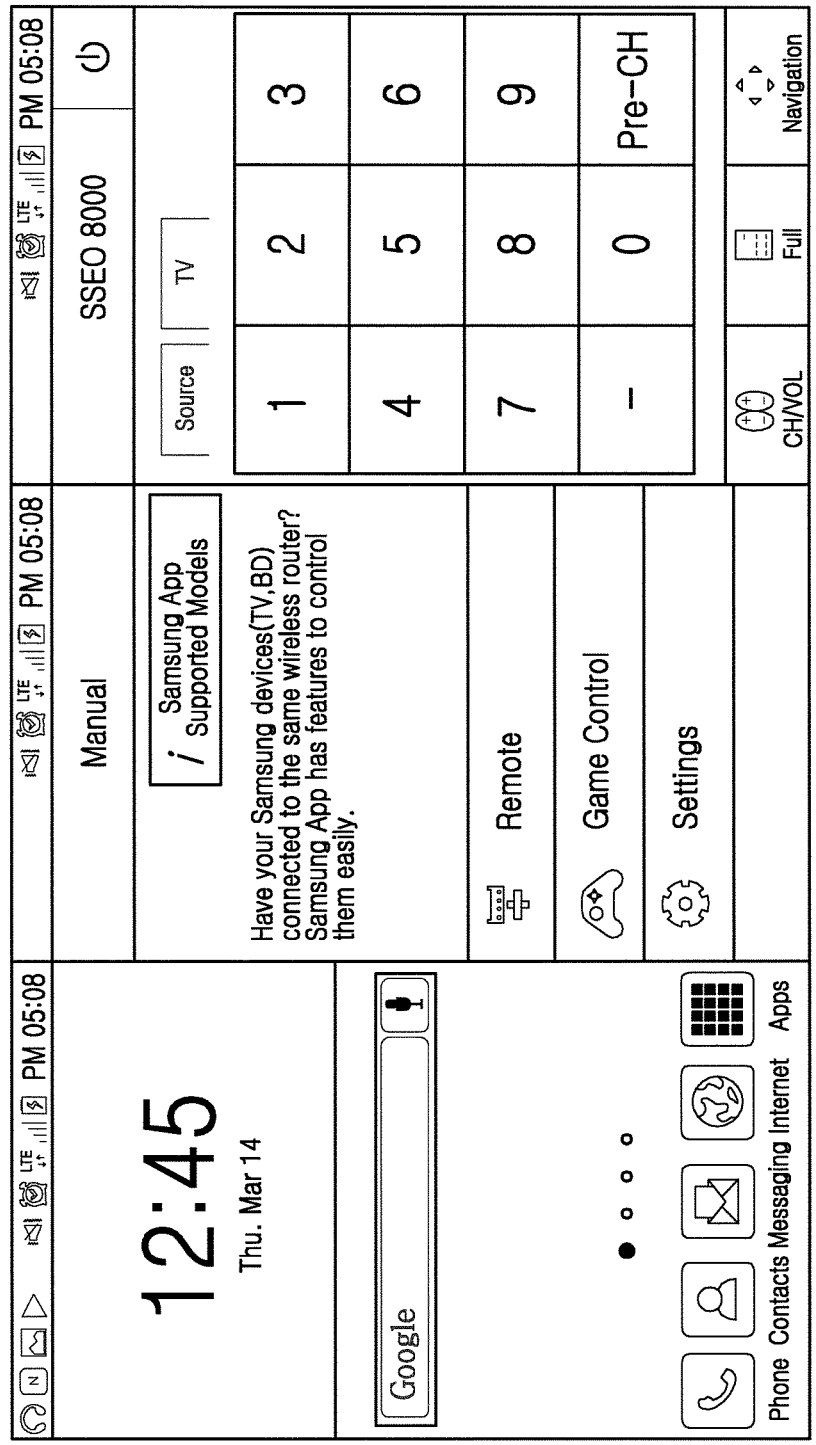
FIG. 4 illustrates a home screen page added according to various embodiments of the present disclosure.

FIG. 4 depicts a home screen page added according to another exemplary embodiment of the present disclosure. The electronic device includes one or more home screen pages. Now, the home screen page addition according to the preset triggering condition is elucidated by referring to FIG. 4.

The electronic device determines whether the preset triggering condition is satisfied. For example, the electronic device determines whether it is connected to the same access point (AP) as a smart television.

When the preset triggering condition is satisfied, the electronic device requests the extended page data corresponding to the triggering condition, from a preset device. When the electronic device is connected to the same AP as the smart television, it requests home screen page data for controlling the smart television, from the smart television.

The electronic device receives the requested home screen page information from the device, configures and adds one or more home screen pages to the home screen, and displays them. For example, the electronic device receives the home screen page for controlling the smart television, from the smart television connected to the same AP, and adds and displays the received home screen page. As shown in FIG. 4, the electronic device displays a control page for controlling the smart television in the home screen page.

The electronic device selects one of information (such as icons or texts) displayed in a manual control page according to the user's selection, and displays a detailed control page associated with the display information. As shown in FIG. 4, the electronic device displays a numeric keypad for controlling a channel of the smart television, or provides another keypad (for returning to a previous channel) for controlling details of the smart television.

Figure 5:
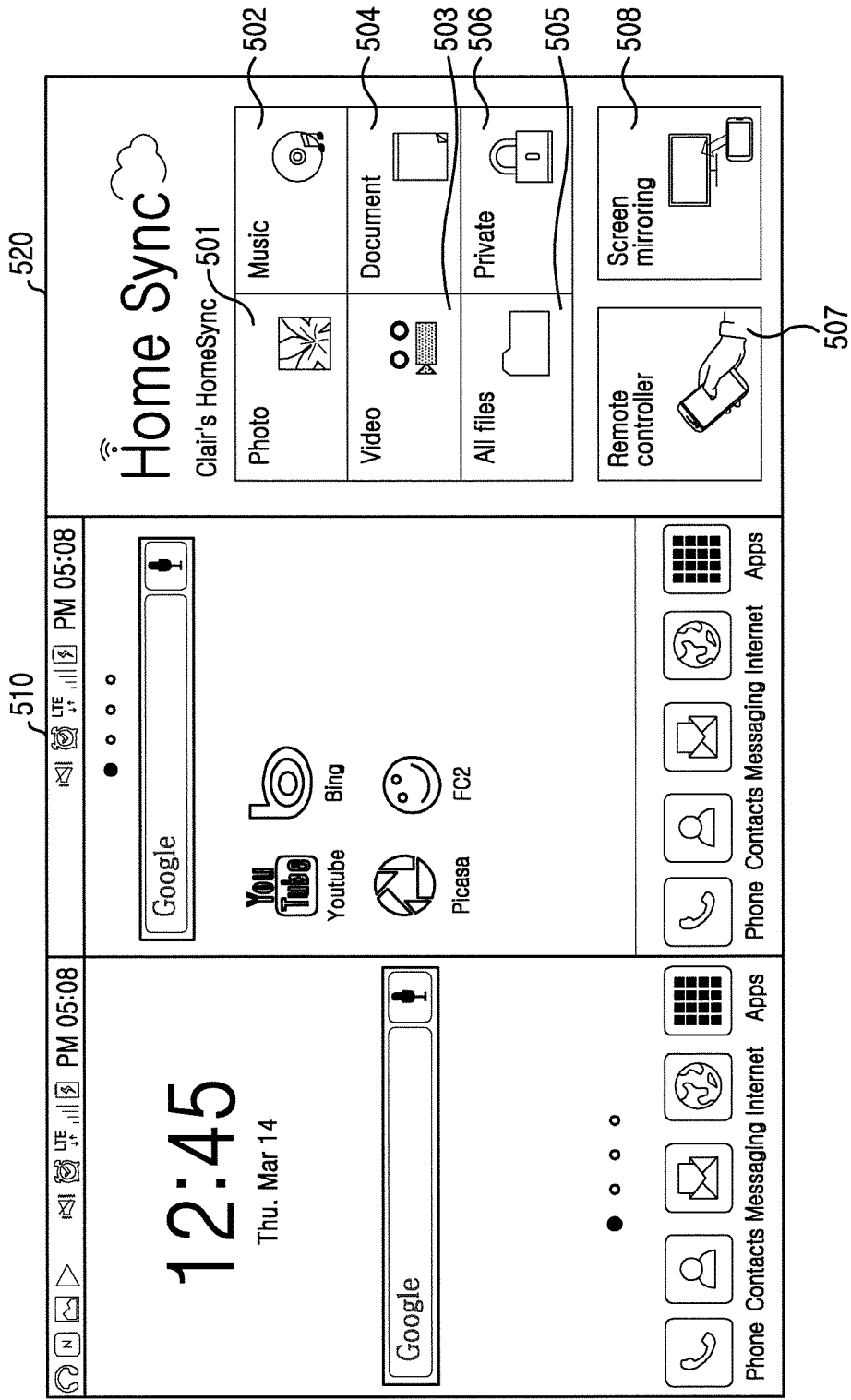
FIG. 5 illustrates a home screen page added according to various embodiments of the present disclosure.

FIG. 5 depicts a home screen page added according to yet another exemplary embodiment of the present disclosure. The electronic device includes one or more home screen pages. The home screen page addition according to the preset triggering condition is elucidated by referring to FIG. 5 (how a portable terminal extends the home screen in association with a home server, for example, a HOMESYNC or a NAS device).

The electronic device determines whether the preset triggering condition is satisfied. For example, the electronic device discovers one or more devices placed within a certain distance from the electronic device using device to device (D2D) network connection and determines whether the one or more devices are connectable. For example, the devices discover each other in the D2D network such as BLUETOOTH low energy (BLE) or Wi-fi Direct, and checks capability by exchanging their services. For example, when meeting the preset triggering condition, the electronic device requests the extended page data corresponding to the triggering condition from the connectable device. When the device is placed in the certain distance and provides the home screen page information, the electronic device requests the home screen page data for controlling each connectable device, from each device.

The electronic device receives the requested home screen page information from the device, creates one or more home screen pages, and adds and displays them in the home screen. The electronic device receives home screen page configuration information for controlling the devices from the devices that are in the certain distance and provides the home screen page information, creates the home screen page using the received home screen configuration information, and adds and displays it in the existing home screen page.

As shown in FIG. 5, the electronic device adds and displays a new home screen page 520 including the manual control page for controlling one or more devices, in an initial home screen 510.

The electronic device selects one of information (e.g., icons 501 through 508 or texts) displayed in the control page according to the user's selection and displays the detailed control page associated with the display information. For example, when the user selects the Photo icon 501, the electronic device accesses and displays photo data information stored in the connected device. When the user selects the Private icon 506, the electronic device accesses and displays private data information stored in the connected device. The electronic device requires additional authorization to access the private information. Such authorization is conducted using user input (such as pattern lock, password, or biometric information), or without the user input using security information (such as international mobile station equipment identity (IMEI), international mobile subscriber identity (IMSI), media access control (MAC)) stored in the device or information generated using the stored information.

Figure 6:
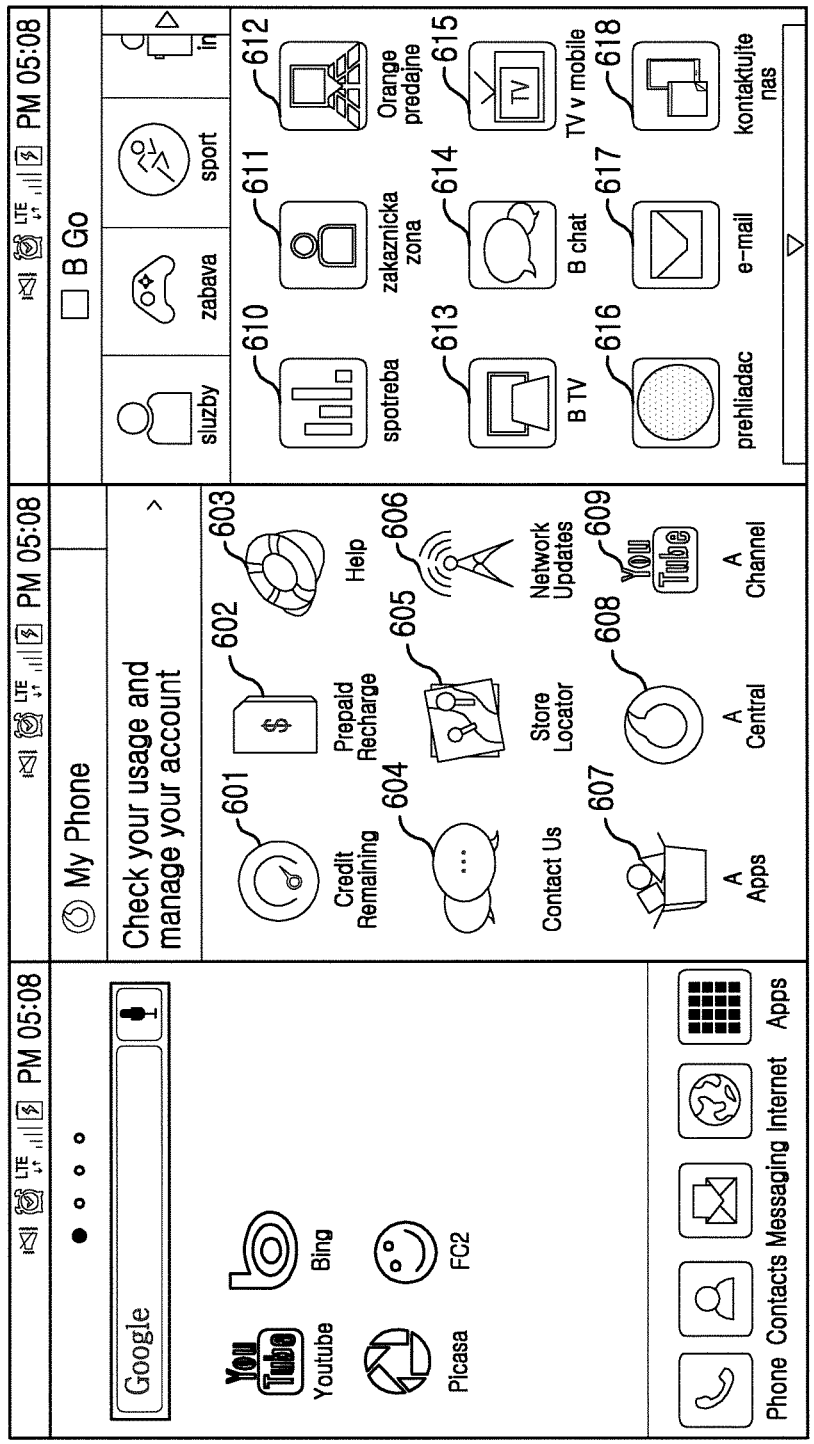
FIG. 6 illustrates a home screen page added according to various embodiments of the present disclosure.

FIG. 6 depicts a home screen page added according to still another exemplary embodiment of the present disclosure. The electronic device includes one or more home screen pages. The home screen page addition according to the preset triggering condition is elucidated by referring to FIG. 6.

The electronic device determines whether the preset triggering condition is satisfied. For example, the electronic device determines whether the inserted SIM is provided from a service provider A or a service provider B.

When meeting the preset triggering condition, the electronic device requests the extended page data corresponding to the triggering condition from a preset service server. For example, when the SIM of the service provider (telecommunications operator) A is replaced with the SIM of the service provider (telecommunications operator) B in the electronic device, the electronic device requests the home screen extended page data from a service server of the service provider B.

The electronic device receives the requested data from the preset server, creates one or more home screen pages, and adds and displays them in the home screen. Based on the data received from the server of the service provider of the new SIM, the electronic device adds and displays one or more pages in the home screen.

As shown in FIG. 6, in the initial home screen, the electronic device adds and displays a home screen page including one or more application information 601 through 618 associated with a specialized service of the service provider of the current SIM.

The electronic device obtains service provider information from the inserted SIM. When the inserted SIM is of the service provider A, the electronic device displays the plurality of the application icons 601 through 609 associated with the specialized service of the service provider A. When the inserted SIM is of the service provider B, the electronic device displays one or more application information 610 through 618 associated with the specialized service of the service provider B.

Figure 7:
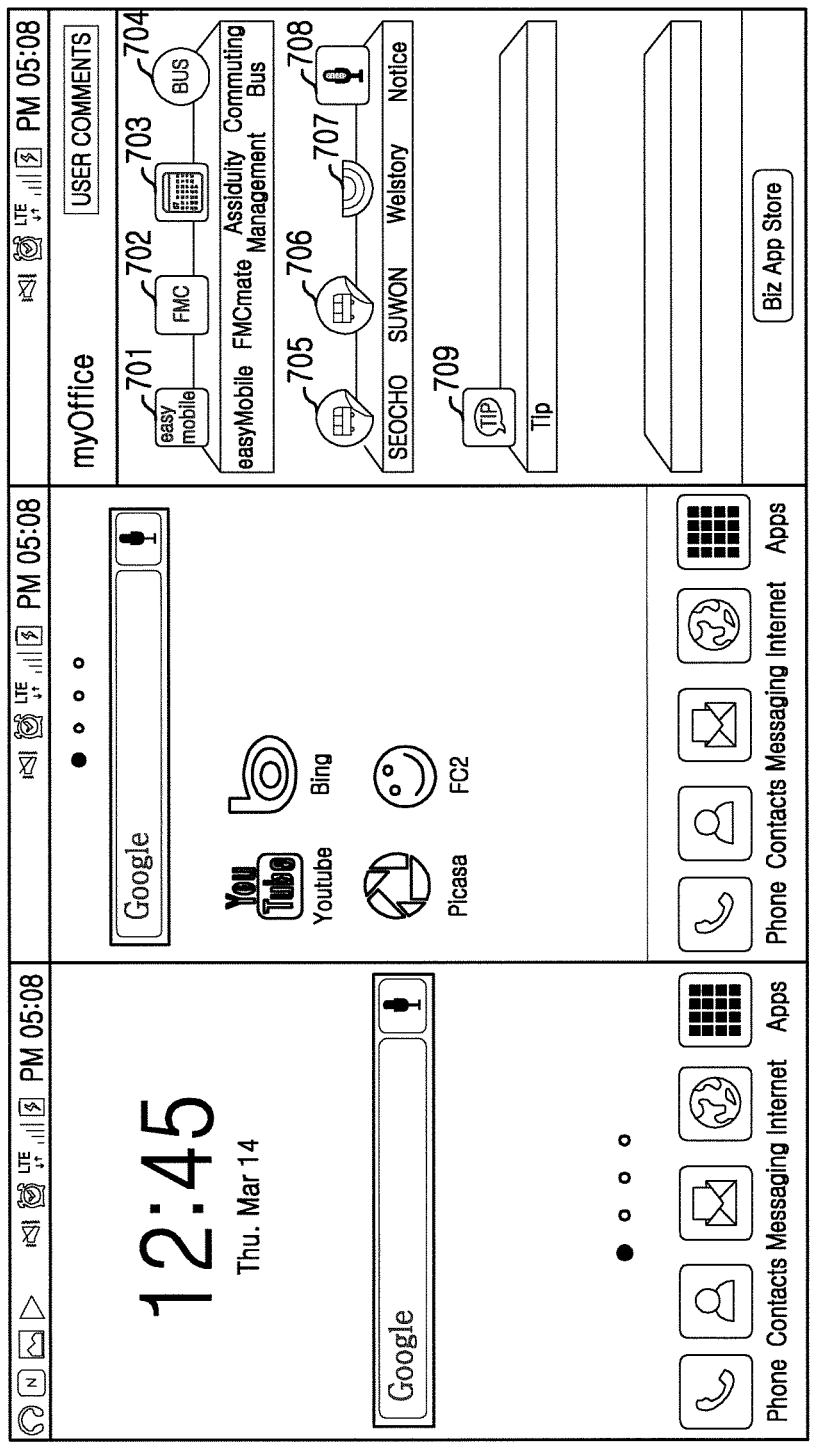
FIG. 7 illustrates a home screen page added according to various embodiments of the present disclosure.

FIG. 7 depicts a home screen page added according to a further exemplary embodiment of the present disclosure. The electronic device includes one or more home screen pages. Now, the home screen page addition according to the preset triggering condition is elucidated by referring to FIG. 7.

The electronic device determines whether the preset triggering condition is satisfied. For example, the electronic device determines whether the information is associated with at least one of a preset location, a preset time, and preset network information. For example, when entering a network area in an office which is a specific region, the electronic device determine whether the information is associated with at least one of a preset office location, preset time-in or time-out, and preset intranet information.

When meeting the preset triggering condition, the electronic device requests data of at least one application frequently used in the preset space, from the server (a server for managing the communications in the specific region). For example, when entering the network area in the office, the electronic device requests home screen page data for expanding the company infrastructure, from the server for managing the corresponding network.

The electronic device receives the requested data from the preset server, creates one or more home screen pages, and adds and displays them in the home screen. In the added home screen page, the electronic device displays one or more application information available only in the preset space.

As shown in FIG. 7, the electronic device adds and displays a new home screen page including the manual control function for controlling the system in the preset space, in the initial home screen.

The electronic device selects one of application icons 701 through 709 displayed in the new home screen created according to the user's selection, and display a detailed menu screen for executing the corresponding function of the icon. For example, when the user selects the assiduity management application icon 703, the electronic device displays user's time-in and time-out, vacation time, and working hours. When the user selects the commuting bus application icon 704, the electronic device displays a service time and a route of the commuting bus. On a particular floor in a particular building, the electronic device adds and displays a home screen including the control screen for controlling air conditioning and heating and lighting of the particular floor, in the home screen.

Figure 8:
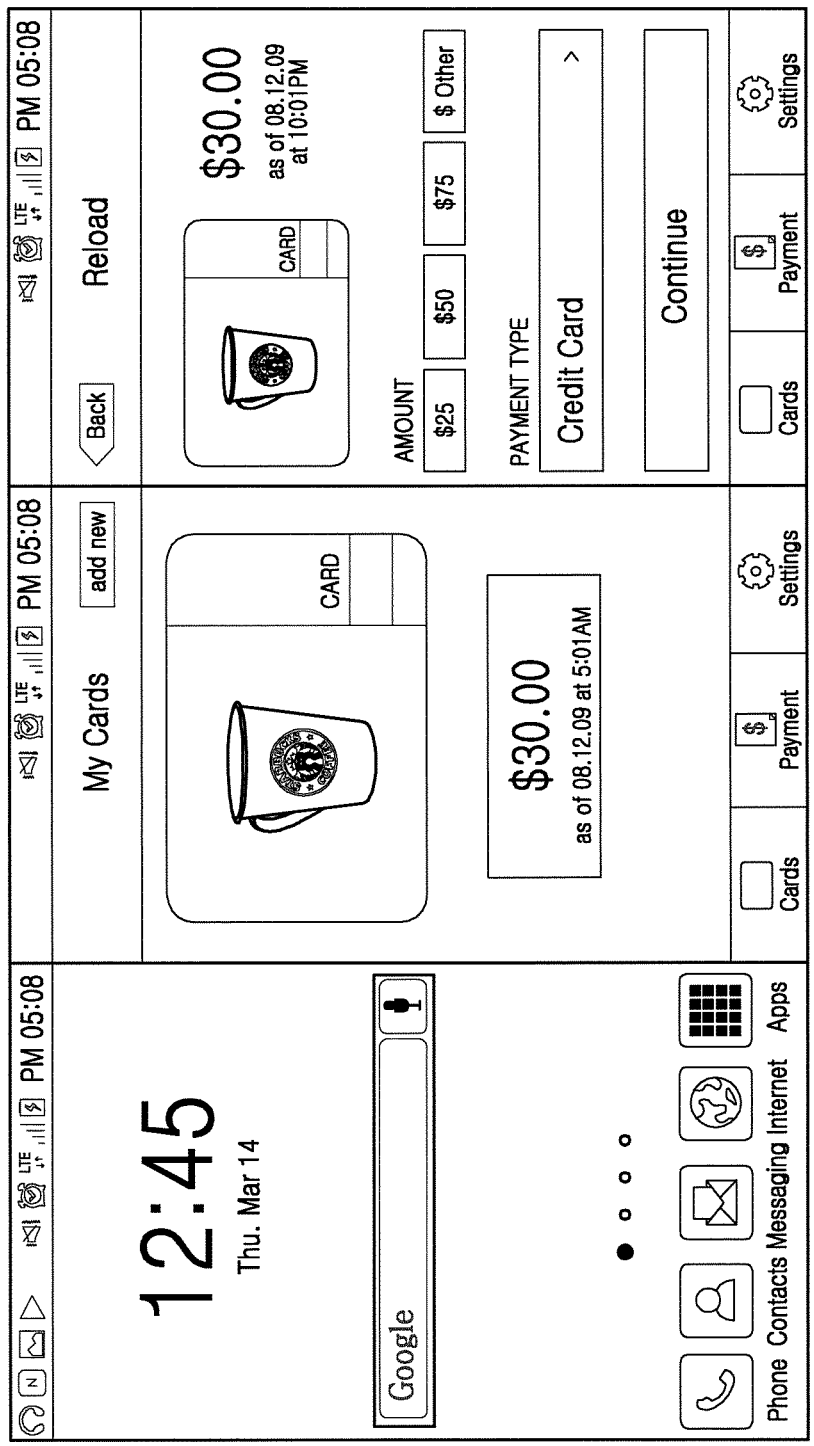
FIG. 8 illustrates a home screen page added according to various embodiments of the present disclosure.

FIG. 8 depicts a home screen page added according to a further exemplary embodiment of the present disclosure. The electronic device includes one or more home screen pages. The home screen page addition according to the preset triggering condition is elucidated by referring to FIG. 8.

The electronic device determines whether the preset triggering condition is satisfied. For example, the electronic device determines whether the information is associated with at least one of a preset location, a preset time, and preset network information.

When meeting the preset triggering condition, the electronic device receives home screen page data including service details provided in a particular region, from a server for providing a particular service. For example, when entering a network area associated with a coffee shop A, the electronic device receives home screen page data including a menu of the coffee shop A, from a server of the coffee shop A.

The electronic device receives the requested data from the preset server, and adds and displays one or more home screen pages in the home screen. For example, in the added home screen page, the electronic device displays the menu and events of the coffee shop A.

As shown in FIG. 8, when visiting the coffee shop A at a particular date and a particular time, the electronic device displays information indicating Americano at 30$ in the added home screen page.

The electronic device displays cumulative point information of a user's club card of the coffee shop A in the added home screen page as shown in FIG. 8.

Figure 9:
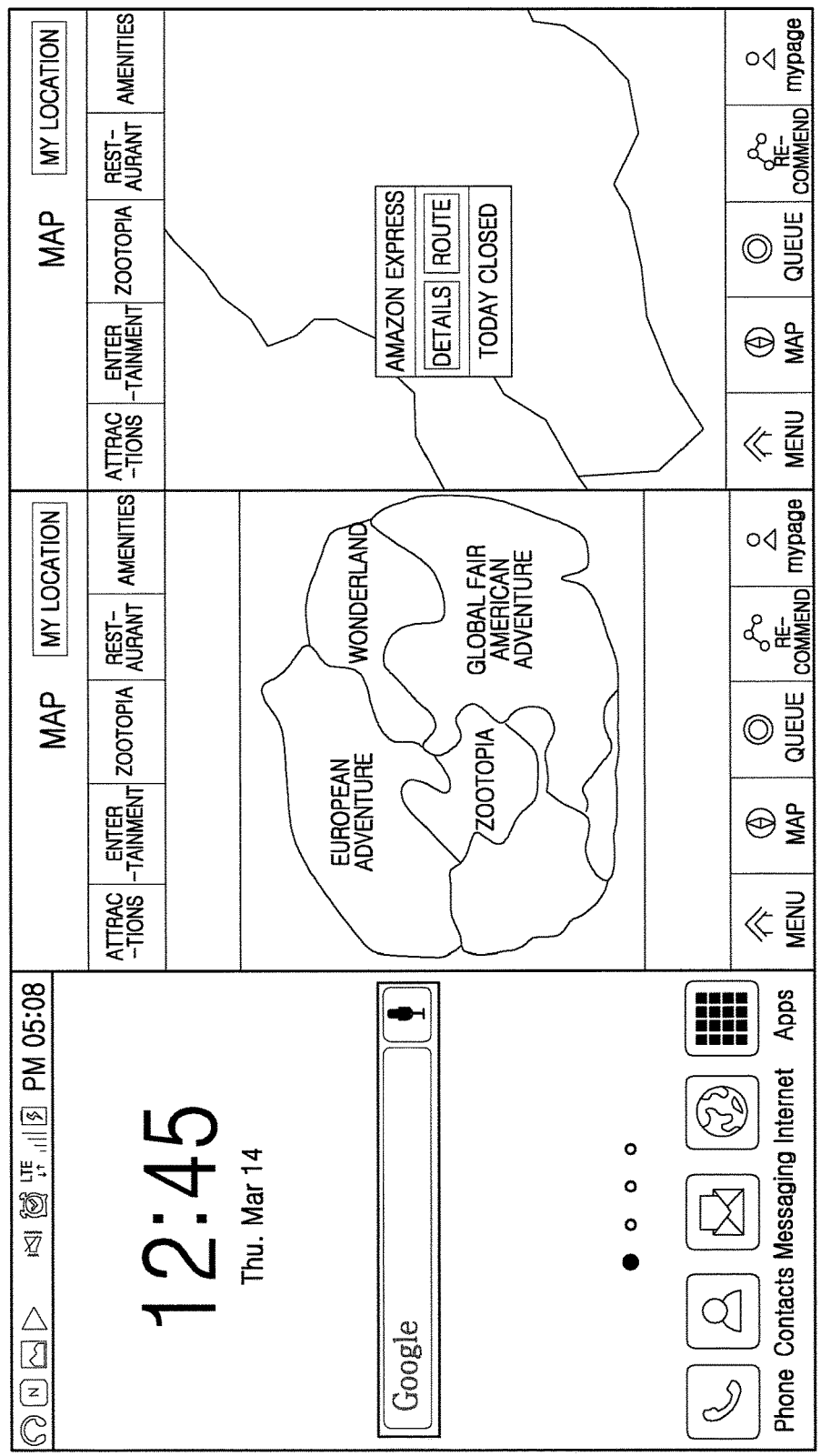
FIG. 9 illustrates a home screen page added according to various embodiments of the present disclosure.

FIG. 9 depicts a home screen page added according to a further exemplary embodiment of the present disclosure. The electronic device includes one or more home screen pages. The home screen page addition according to the preset triggering condition is elucidated by referring to FIG. 9.

The electronic device determines whether the preset triggering condition is satisfied. For example, the electronic device determines whether the information is associated with at least one of a preset location, a preset time, and preset network information.

When meeting the preset triggering condition, the electronic device receives home screen page data including service details provided in a particular region, from a particular service server. For example, when entering a network area associated with an amusement park A, the electronic device receives home screen page data including additional service details of the amusement park A, from a server of the amusement park A.

For example, the electronic device receives the data of the additional service details using global positioning system (GPS) based geo fencing. For example, in a preset radius of the amusement park A, the electronic device receives the home screen page data including the additional service details from the server of the amusement park A.

The electronic device receives the requested data from the preset server, and adds and displays one or more home screen pages in the home screen. For example, the electronic device displays opening hours, events, and tickets of the amusement park A in the added home screen page.

As shown in FIG. 9, the electronic device displays a guide map of the amusement park A in the added home screen page. When entering the network area associated with the amusement park A, the electronic device receives the guide map of the amusement park A. The amusement park A leads electronic device users in vicinity to visit the amusement park A. For example, when entering the amusement park A, the user easily displays the guide map of the amusement park A in the electronic device without having to separately download or search the guide map of the amusement park A.

As shown in FIG. 9, the electronic device displays various attraction information of the amusement park A in the added home screen page. The electronic device user easily obtains the various attraction information added and displayed in the home screen page. For example, when the user selects a particular one of attraction icons added and displayed in the home screen page, the electronic device displays detailed attraction information. For example, the electronic device obtains popularity and ride queue of the particular attraction selected by the user.

Figure 10:
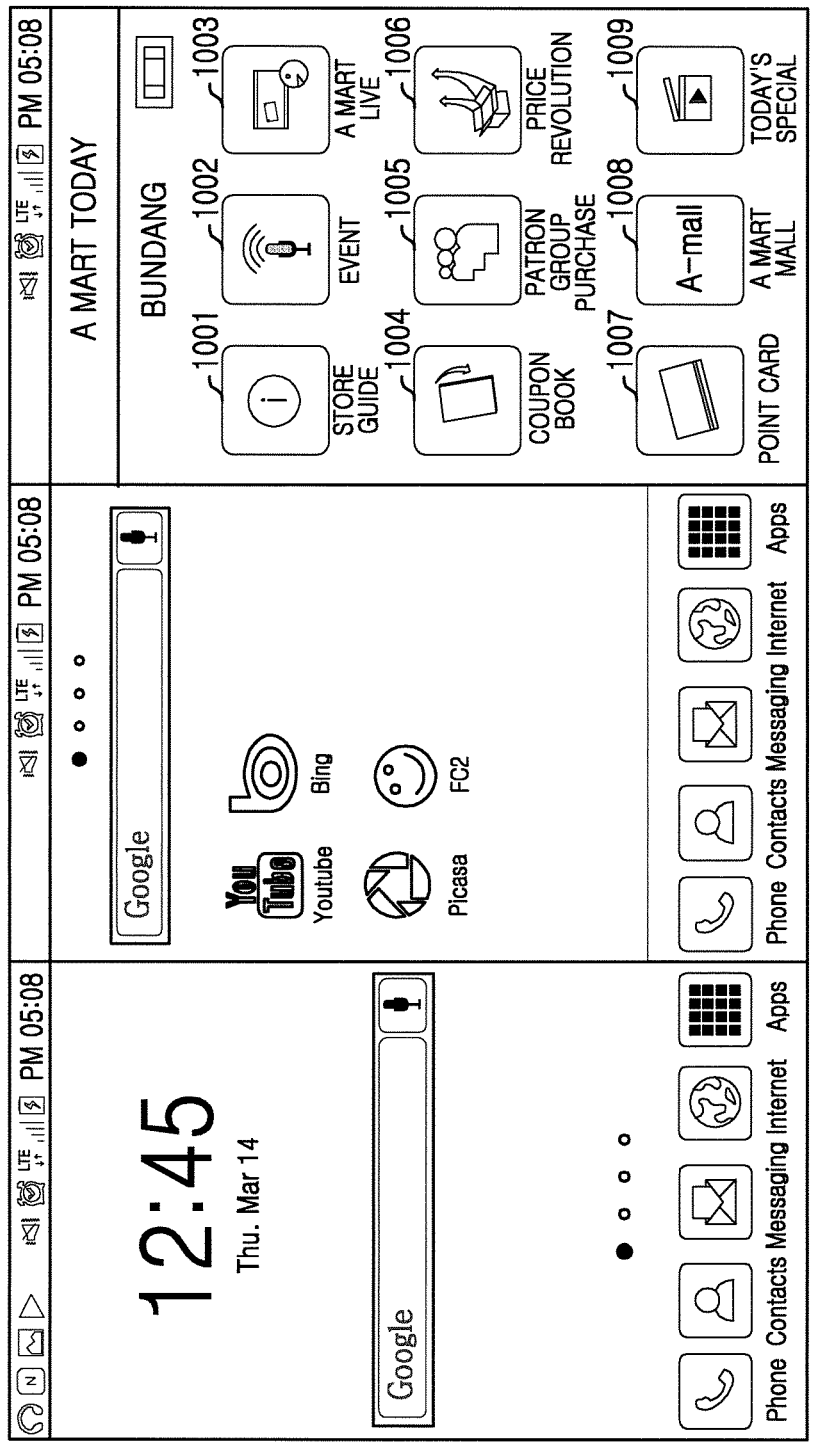
FIG. 10 illustrates a home screen page added according to various embodiments of the present disclosure.

FIG. 10 depicts a home screen page added according to a further exemplary embodiment of the present disclosure. The electronic device includes one or more home screen pages. The home screen page addition according to the preset triggering condition is elucidated by referring to FIG. 10.

The electronic device determines whether the preset triggering condition is satisfied. For example, the electronic device determines whether the information is associated with at least one of a preset location, a preset time, and preset network information.

When meeting the preset triggering condition, the electronic device receives home screen page data including service details provided in a particular region, from a particular service server. For example, when entering a network area associated with a mart A, the electronic device receives home screen page data including additional service details of the mart A, from a server of the mart A.

The electronic device receives the requested data from the preset server, and adds and displays one or more home screen pages in the home screen. For example, the electronic device displays opening hours, events, and points of the mart A in the added home screen page.

As shown in FIG. 10, the electronic device adds and displays a new home screen page including a service manual for the preset region in the initial home screen. For example, when entering the network area of the mart A, the home screen page added in the electronic device includes and displays various application information 1001 through 1009 of the mart A.

The electronic device displays application information using location recognition based on sound data. For example, upon receiving the sound information (inaudible sound data) produced in the mart A and entering the mart A, the electronic device extends its home screen.

When selecting the mart guide application icon 1001 displayed in the home screen page, the electronic device displays product locations in the store. For example, when selecting the point loyalty card application icon 1007 displayed in the home screen page, the electronic device displays the cumulative point information of the user in the mart A.

Figure 11:
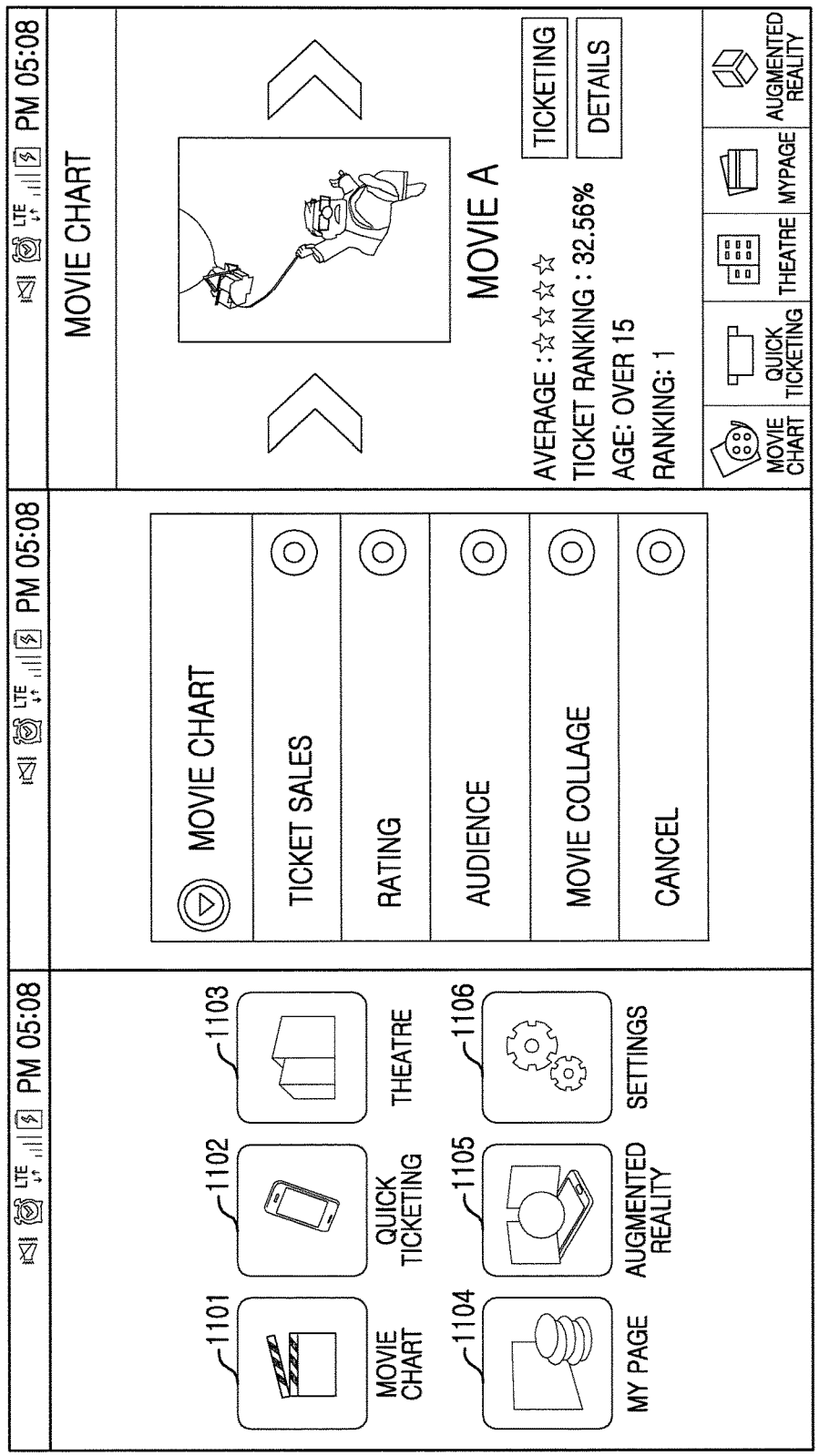
FIG. 11 illustrates a home screen page added according to various embodiments of the present disclosure.

FIG. 11 depicts a home screen page added according to a further exemplary embodiment of the present disclosure. The electronic device includes one or more home screen pages. The home screen page addition according to the preset triggering condition is elucidated by referring to FIG. 11.

The electronic device determines whether the preset triggering condition is satisfied. For example, the electronic device determines whether the information is associated with at least one of a preset location, a preset time, and preset network information.

When meeting the preset triggering condition, the electronic device receives home screen page data including service details provided in a particular region, from a particular service server. For example, when entering a network area associated with a movie theatre A, the electronic device receives home screen page data including additional service details of the movie theatre A, from a server of the movie theatre A. The electronic device confirm the area associated with the movie theatre A using network information such as WIFI, BT, BLE, or mobile communication cell information, or using sound waves and ultrasonic waves received at the microphone of the electronic device. The electronic device determine the entrance to the particular area using visible light communications called LiFi using image information fed from a camera or light flickering from a light emitting device such as light emitting diode (LED).

The electronic device receives the requested data from the preset server, and adds and displays one or more home screen pages in the home screen. For example, the electronic device displays opening hours, events, and points of the movie theatre A in the added home screen page.

As shown in FIG. 11, the electronic device adds and displays a new home screen page including a control page for providing services in the preset region. For example, when entering the network area of the movie theatre A, the home screen page added in the electronic device includes and displays various application information 1101 through 1106 of the movie theatre A.

When selecting the movie chart application icon 1101 displayed in the home screen page, the electronic device displays movie ranking by advance ticket sales in theatres nationwide. For example, when selecting the quick ticket application icon 1102 displayed in the home screen page, the electronic device displays ticketing information in the added home screen page so that the electronic device user quickly books the ticket.

When the user selects the movie chart application icon 1101, the electronic device receives details about ticket ranking, rating, and audience. For example, when the user selects the rating, the electronic device sequentially displays the movies in the descending order of the ticket sales.

Figure 12:
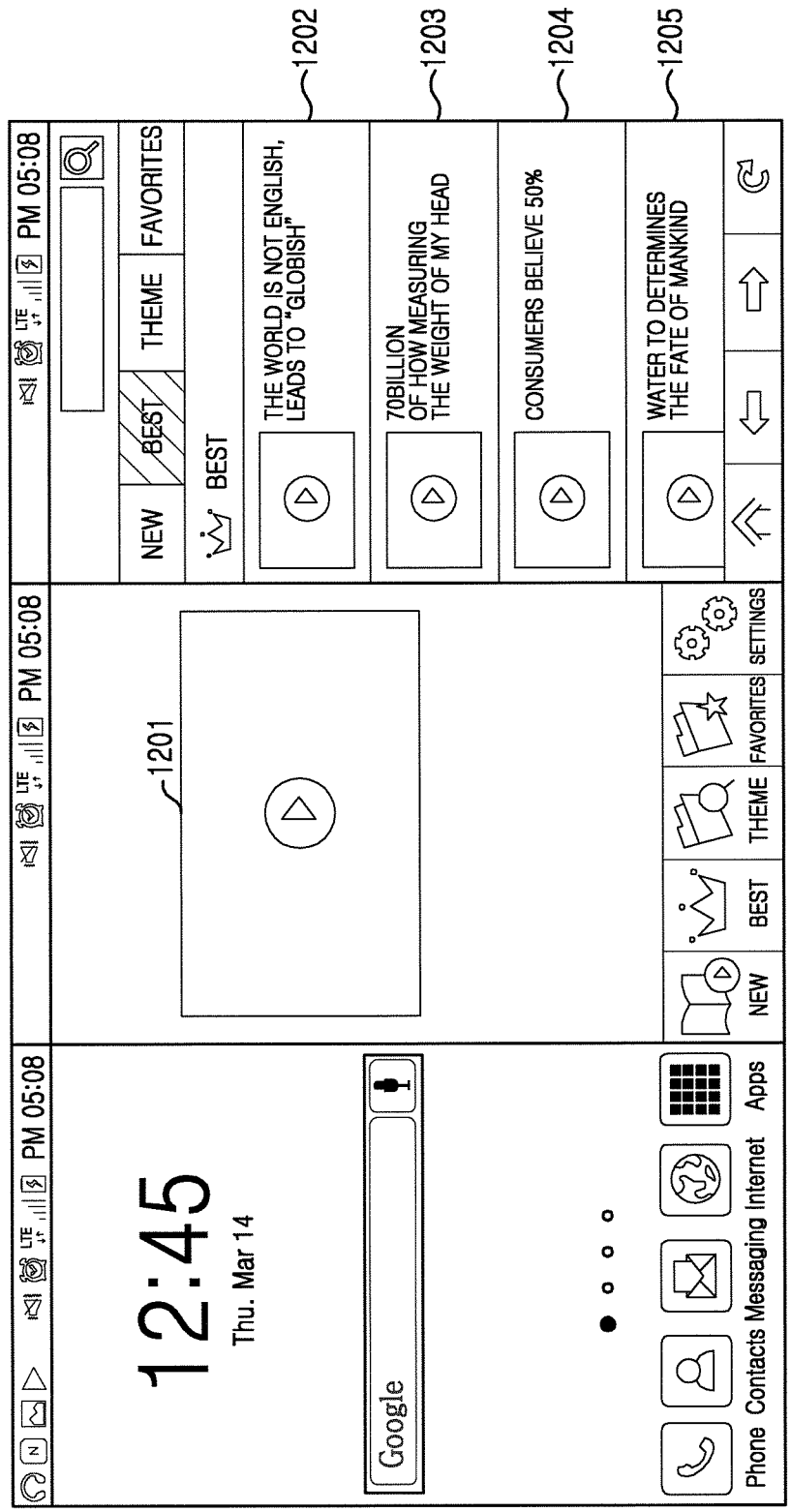
FIG. 12 illustrates a home screen page added according to various embodiments of the present disclosure.

FIG. 12 depicts a home screen page added according to a further exemplary embodiment of the present disclosure. The electronic device includes one or more home screen pages. The home screen page addition according to the preset triggering condition is elucidated by referring to FIG. 12.

The electronic device determines whether the preset triggering condition is satisfied. For example, the electronic device determines whether the information is associated with at least one of a preset location, a preset time, and preset network information.

When meeting the preset triggering condition, the electronic device receives home screen page data including service details provided in a particular region, from a particular service server. For example, when entering a network area associated with a bookstore A, the electronic device receives home screen page data including additional service details of the bookstore A, from a server of the bookstore A.

The electronic device receives the requested data from the preset server, and adds and displays one or more home screen pages in the home screen. For example, the electronic device displays opening hours, events, and points of the bookstore A in the added home screen page.

As shown in FIG. 12, the electronic device adds and displays a new home screen page including a control page for providing services in the preset region. For example, when entering the network area of the bookstore A, the home screen page added in the electronic device includes and displays book promotion video 1201 offered by the bookstore A, in the added home screen page.

When selecting a bestseller book application icon displayed in the home screen page, the electronic device displays sales ranking and brief data 1202, 1203, and 1204 of the books on sale in bookstores nationwide.

When leaving the preset region, the electronic device may not display the added home screen page any more. The added home screen information received is stored and managed in a particular area of the electronic device, or deleted to secure the storage space. When storing the added home screen information received in the particular area and then re-entering the same area, the electronic device displays the home screen page using the stored data.

Figure 13:
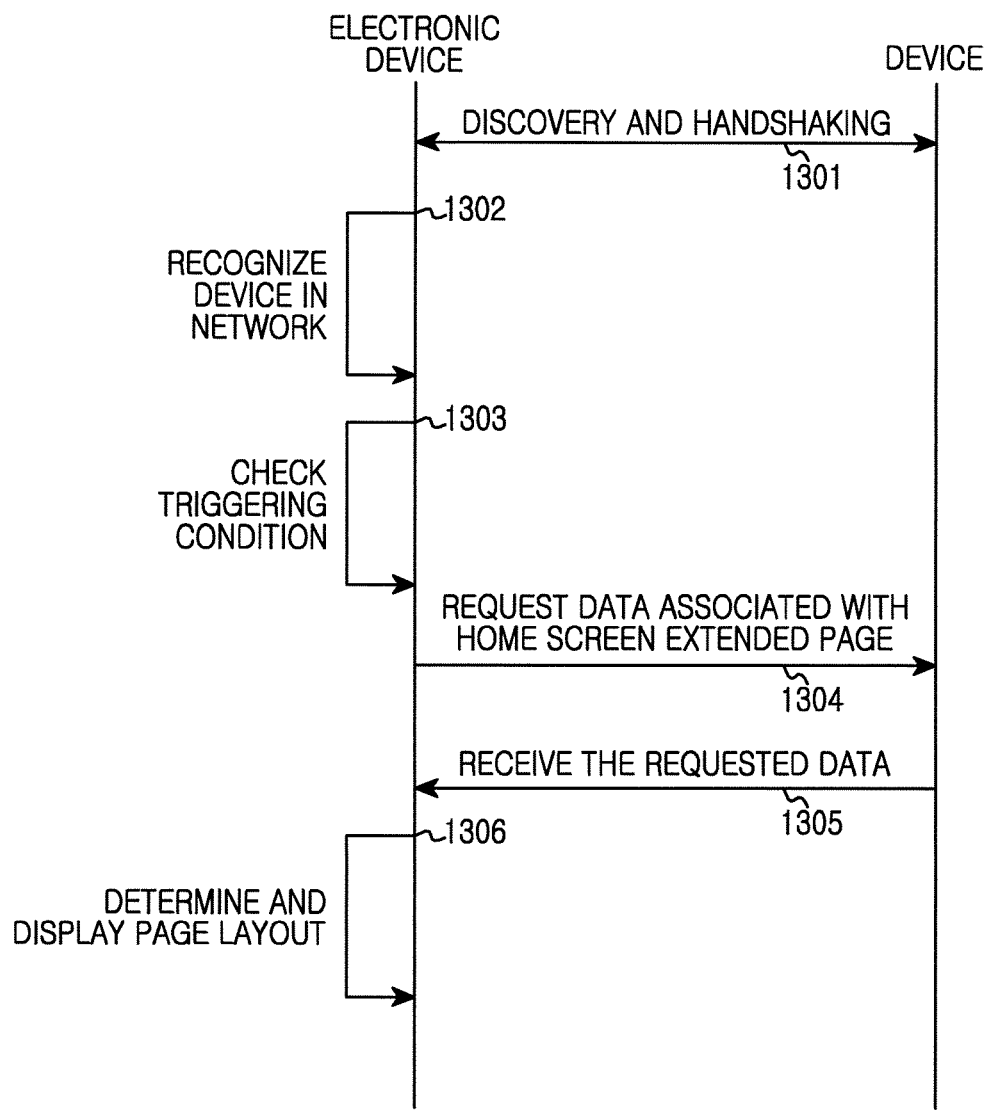
FIG. 13 illustrates operations between the electronic device and a device according to various embodiments of the present disclosure.

FIG. 13 is a flowchart of operations between the electronic device and the device according to various embodiments of the present disclosure. In operation 1301, the electronic device and the device perform a discovery process and a handshaking process. The electronic device and the device perform the discovery process and the handshaking process for their mutual communication.

In operation 1302, the electronic device recognizes the device in the network. For example, the electronic device recognizes the device in the preset network through the discovery process and the handshaking process of operation 1301.

In operation 1303, the electronic device confirms the preset triggering condition. For example, the electronic device confirms its connection to the same network as one or more connectable devices.

In operation 1304, the electronic device requests the home screen extended page data from the preset device. For example, the electronic device requests the home screen page data to add, from the device in the same network.

In operation 1305, the electronic device receives the requested data from the device. For example, the electronic device receives the requested home screen extended page data from the device in the same network.

In operation 1306, the electronic device determines and displays a page layout. For example, after determining the page layout, the electronic device displays one or more applications for controlling the device in the same network, using the determined page layout.

Figure 14:
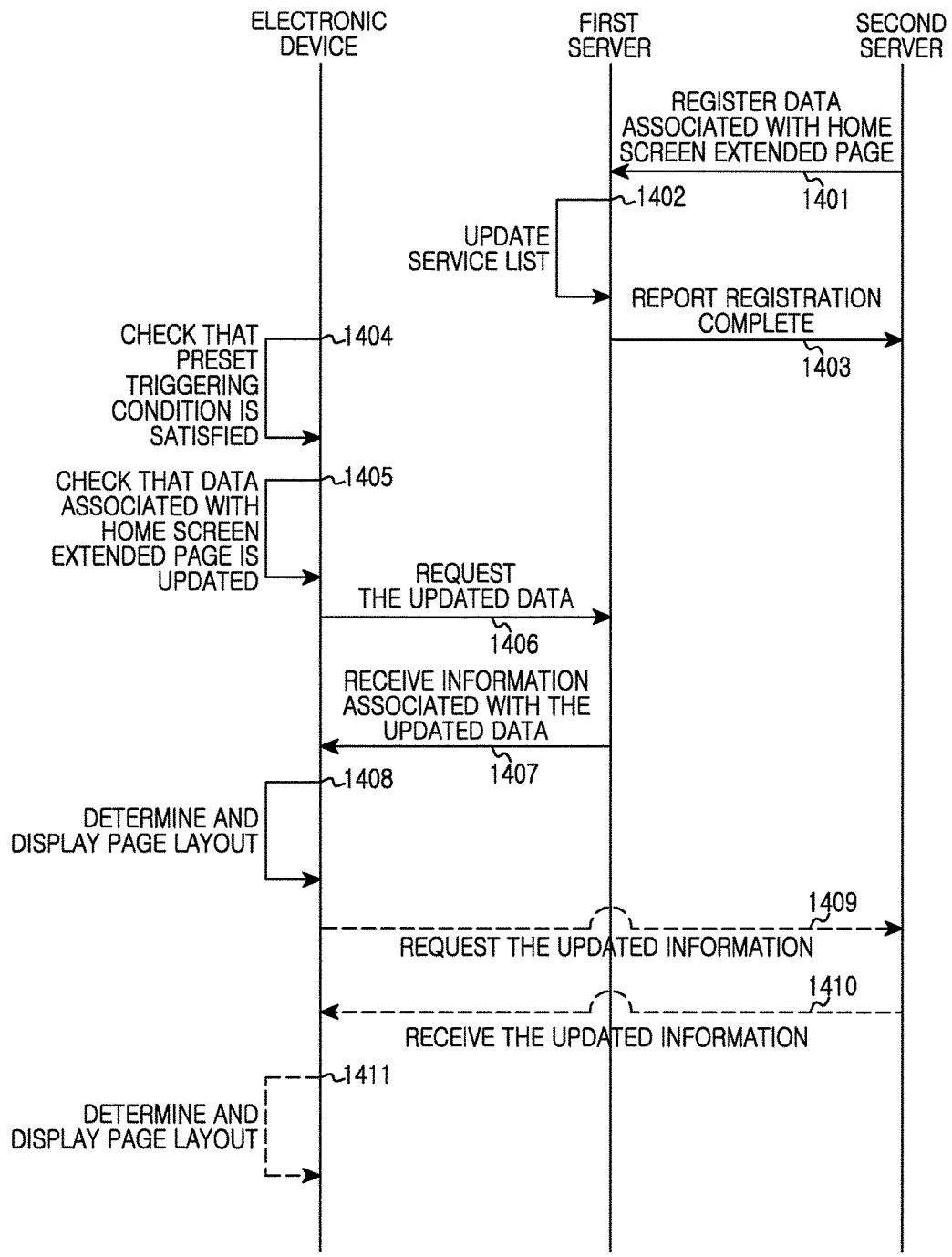
FIG. 14 illustrates operations of the electronic device, a first server, and a second server according to various embodiments of the present disclosure.

FIG. 14 is a flowchart of operations of the electronic device, a first server, and a second server according to various embodiments of the present disclosure. In operation 1401, the second server registers the home screen extended page data to the first server. For example, the second server is a server operated by the service provider.

In operation 1402, the first server updates a service list. For example, the first server updates the service list in order to forward the updated home screen extended page data from the second server to a plurality of electronic devices.

In operation 1403, the first server reports the registration complete to the second server. For example, the first server reports the home screen extended page update to the second server.

In operation 1404, the electronic device confirms that the preset triggering condition is satisfied. For example, the electronic device confirms one or more preset SIMs inserted, the connection to the network associated with the one or more preset devices, and the same information as at least one of the preset location, the preset time, and the preset network information.

In operation 1405, the electronic device confirms that the home screen extended page data is updated. For example, when confirming the satisfied preset triggering condition and then determining no relevant data update, the electronic device may not re-request the home screen extended page data from the first server.

In operation 1406, the electronic device requests the update data from the first server. For example, the electronic device requests the related data from the first server only when the home screen extended page data is updated.

In operation 1407, the electronic device receives the updated data information from the first server.

In operation 1408, the electronic device determines and displays the page layout. For example, after determining the page layout, the electronic device displays the preset condition and the related information using the determined page layout.

In operation 1409, the electronic device requests the updated information from the second server. For example, when receiving a uniform resource locator (URL) address storing the updated information from the first server, the electronic device directly requests the updated information from the second server by accessing the corresponding URL.

In operation 1410, the electronic device receives the updated information from the second server.

In operation 1411, the electronic device determines and displays the page layout.

Figure 15:
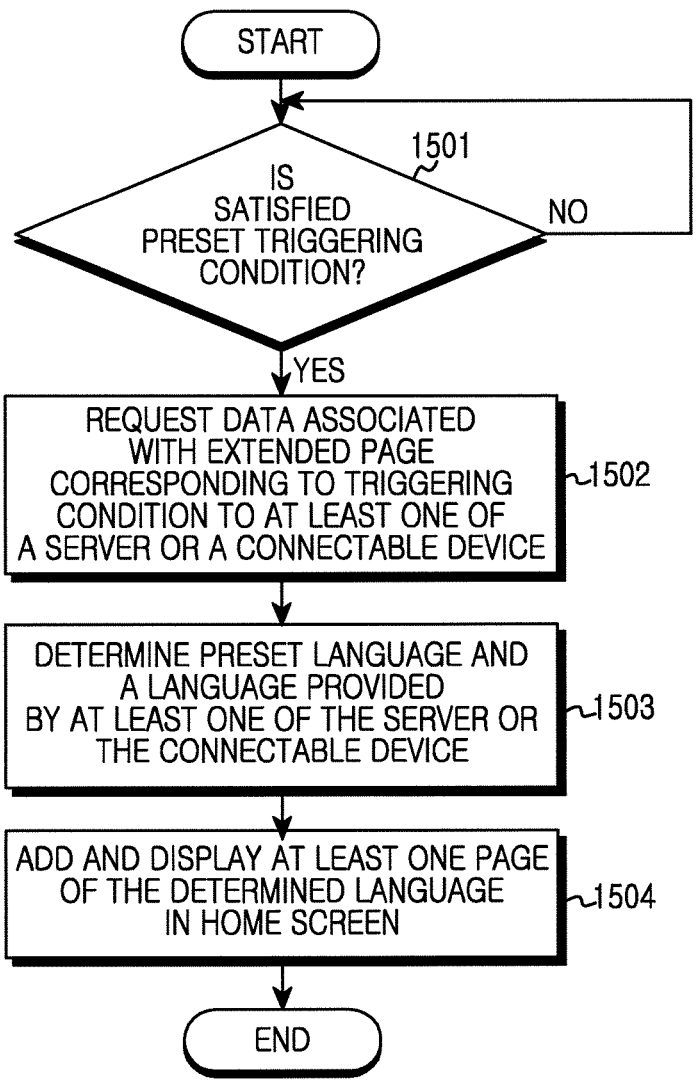
FIG. 15 illustrates operations of the electronic device according to various embodiments of the present disclosure.

FIG. 15 is a flowchart of operations of the electronic device according to various embodiments of the present disclosure. In operation 1501, the electronic device determines whether the preset triggering condition is satisfied. For example, the electronic device determines whether one or more preset SIMs are inserted, whether one or more preset devices are connectable, or whether the information is associated with at least one of the preset location, the preset time, and the preset network information.

In operation 1502, the electronic device requests the extended page data corresponding to the triggering condition from one of the server and the connectable device. For example, when being connected to the same network as the one or more preset devices, the electronic device requests the home screen extended page data from the device connected in the same network.

In operation 1503, the electronic device determines a preset language and a language provided by either the server or the device. For example, when providing the service in Korean beforehand, the electronic device requests Korean home screen information from the server. In operation 1504, the electronic device adds and displays at least one page of the determined language in the home screen. For example, the page added to the home screen of the electronic device displays multiple application information for the functions in the preset language.

Figure 16:
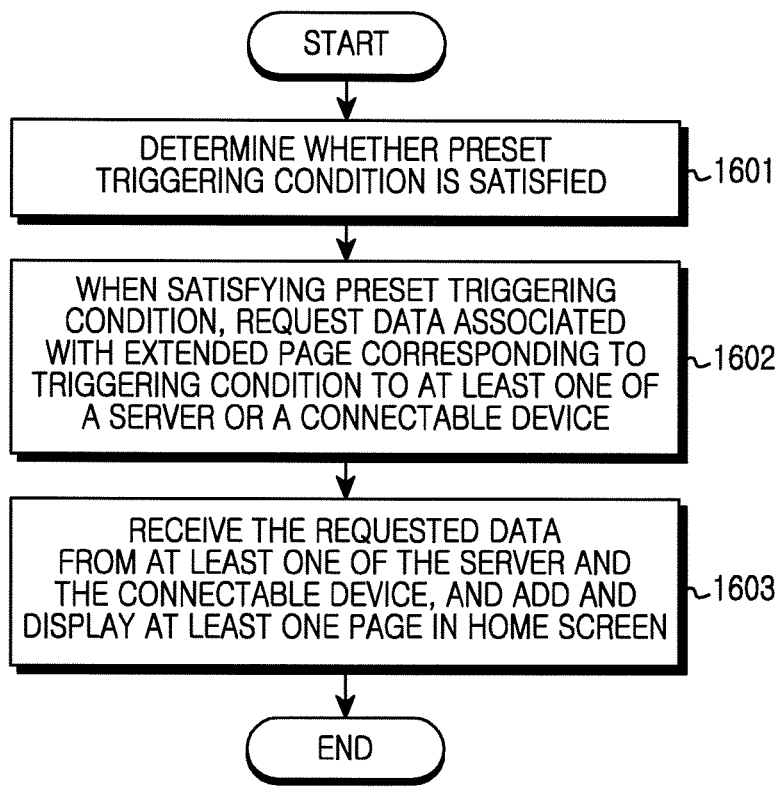
FIG. 16 illustrates operations of the electronic device according to various embodiments of the present disclosure.

FIG. 16 is a flowchart of operations of the electronic device according to various embodiments of the present disclosure. In operation 1601, the electronic device determines whether the preset triggering condition is satisfied. For example, the electronic device determines whether one or more preset SIMs are inserted, whether one or more preset devices are connectable, or whether the information is associated with at least one of the preset location, the preset time, and the preset network information.

In operation 1602, when meeting the preset triggering condition, the electronic device requests the extended page data corresponding to the triggering condition from either the server or the connectable device. For example, the electronic device requests the home screen extended page data from the server of the manufacturer of the new SIM.

In operation 1603, the electronic device receives the requested data from the server and the preset device, and adds and displays at least one page in the home screen. For example, the electronic device displays a menu, opening hours, and event information of a restaurant near the electronic device, in the added home screen page.

According to various embodiments of the preset disclosure, a method for operating an electronic device includes determining whether a preset triggering condition is satisfied; when satisfying the preset triggering condition, requesting extended page data corresponding to the triggering condition, from either a server or a connectable device; and receiving the requested data from either the server or the connectable device, and adding and displaying at least one page in a home screen.

The determining of whether the preset triggering condition is satisfied includes determining whether one or more SIMs are inserted.

The determining of whether the preset triggering condition is satisfied includes determining whether one or more preset devices are connectable.

The determining of whether the preset triggering condition is satisfied includes determining whether information is associated with at least one of a preset location, a preset time, and preset network information.

The requesting of the data includes requesting at least one service data associated with the inserted SIM, from the server.

The determining of whether the preset triggering condition is satisfied includes requesting data associated with at least one service for controlling at least one device in a preset network, from the device.

The requesting of the data includes requesting data associated with at least one service for controlling a system in a preset space, from the server.

The requesting of the data includes requesting data associated with at least one service for obtaining relevant information in a preset space, from the server.

The displaying includes displaying at least one application associated with the inserted SIM in the added home screen page.

The displaying includes displaying at least one service for controlling at least one device placed in a preset network, in the added home screen page.

The displaying includes displaying at least one service for controlling at least one service for controlling a system in a preset space, in the added home screen page.

The displaying includes displaying at least one service for obtaining relevant information in a preset space, in the added home screen page.

The displaying includes determining a preset language and a language provided by one of the server and the device; and requesting and receiving home screen data of the determined language from the server.

The method further includes when satisfying the preset triggering condition, determining whether information is updated; and when no information is updated, displaying the added home screen page.

The determining of whether the preset triggering condition is satisfied includes determining whether a particular region is entered using at least one of sound waves and ultrasonic waves collected.

The determining of whether the preset triggering condition is satisfied includes determining whether a particular region is entered using image information collected and visible light communications LiFi.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
 a display;
 communication circuitry; and
 at least one processor configured to:
  identify whether the electronic device and an external electronic device are connected to a first access point (AP),
  in response to identifying that the electronic device and the external electronic device are connected to the first AP, request, using the communication circuitry, data associated with a home screen page for controlling a function of the external electronic device from the external electronic device through the first AP,
  receive, using the communication circuitry, the data associated with the home screen page from the external electronic device through the first AP,
  add, based on the received data, the home screen page to a home screen including at least one home screen page, wherein each of the at least one home screen page includes at least one same application icon and indicators representing the at least one home screen page, and
  control the display to display the added home screen page.

2. The electronic device of claim 1, wherein the at least one processor is further configured to control the display to display a user interface (UI) for controlling the function of the external electronic device in the added home screen page.

3. The electronic device of claim 1, wherein the at least one processor is further configured to:
 receive an input for a first object among a plurality of objects included in the UI; and
 transmit, using the communication circuitry, control information mapped with the first object to the external electronic device.

4. The electronic device of claim 1, wherein the at least one processor is further configured to:
 identify a pre-set language and a language provided by the external electronic device; and
 request and receive, using the communication circuitry, home screen data of a determined language from the external electronic device.

5. The electronic device of claim 1, wherein the at least one processor is further configured to delete the added home screen page from the home screen when a connection with the first AP is released.

6. A method for operating an electronic device, comprising:
 identifying, by at least one processor of the electronic device, whether the electronic device and an external electronic device are connected to a first access point (AP);
 in response to identifying that the electronic device and the external electronic device are connected to the first AP, requesting, by the at least one processor, using a communication circuitry of the electronic device, data associated with a home screen page for controlling a function of the external electronic device from the external electronic device through the first AP;
 receiving, by the at least one processor, using the communication circuitry, the data associated with the home screen page from the external electronic device through the first AP;
 adding, by the at least one processor, based on the received data, the home screen page to a home screen including at least one home screen page, wherein each of the at least one home screen page includes at least one same application icon and indicators representing the at least one home screen page; and
 controlling, by the at least one processor, a display of the electronic device to display the added home screen page.

7. The method of claim 6, wherein controlling the display to display the added home screen page further comprising:
 controlling the display to display a user interface (UI) for controlling the function of the external electronic device in the added home screen page.

8. The method of claim 6, further comprising:
 receiving an input for a first object among a plurality of objects included in the UI; and
 transmitting, using the communication circuitry, control information mapped with the first object to the external electronic device.

9. The method of claim 6, further comprising:
 identifying a pre-set language and a language provided by the external electronic device; and
 requesting and receiving, via the communication circuitry, home screen data of the identified language from the external electronic device.

10. The method of claim 6, further comprising:
deleting the added home screen page from the home screen when a connection with the first AP is released.

\* \* \* \* \*